US010451425B2

(12) United States Patent
Al-Dahle et al.

(10) Patent No.: US 10,451,425 B2
(45) Date of Patent: Oct. 22, 2019

(54) AUTONOMOUS NAVIGATION SYSTEM

(71) Applicant: Apple Inc., Cupertino, CA (US)

(72) Inventors: Ahmad Al-Dahle, San Jose, CA (US); Matthew E. Last, San Jose, CA (US); Philip J. Sieh, San Jose, CA (US); Benjamin Lyon, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 15/531,354

(22) PCT Filed: Dec. 4, 2015

(86) PCT No.: PCT/US2015/064059
§ 371 (c)(1),
(2) Date: May 26, 2017

(87) PCT Pub. No.: WO2016/090282
PCT Pub. Date: Jun. 9, 2016

(65) Prior Publication Data
US 2017/0363430 A1 Dec. 21, 2017

Related U.S. Application Data

(60) Provisional application No. 62/088,428, filed on Dec. 5, 2014.

(51) Int. Cl.
*G01C 21/32* (2006.01)
*G05D 1/02* (2006.01)
(Continued)

(52) U.S. Cl.
CPC ......... *G01C 21/32* (2013.01); *G01C 21/3415* (2013.01); *G05D 1/0212* (2013.01);
(Continued)

(58) Field of Classification Search
CPC ... G01C 21/32; G01C 21/3415; B60W 30/00; G05D 1/0212; G05D 1/0221; G05D 1/0276; G05D 2201/0213
(Continued)

(56) References Cited

U.S. PATENT DOCUMENTS 8,634,980 B1    1/2014  Urmson et al.
9,378,601 B2 *  6/2016  Ricci .................. B60Q 1/00
(Continued)

FOREIGN PATENT DOCUMENTS

WO    2014/139821    9/2014

OTHER PUBLICATIONS

International Preliminary Report from PCT/US2015/064059, dated Jun. 15, 2017, Apple Inc., pp. 1-16.

*Primary Examiner* — Atul Trivedi
(74) *Attorney, Agent, or Firm* — Robert C. Kowert; Meyertons, Hood, Kivlin, Kowert & Goetzel, P.C.

(57) ABSTRACT

Some embodiments provide an autonomous navigation system which enables autonomous navigation of a vehicle along one or more portions of a driving route based on monitoring, at the vehicle, various features of the route as the vehicle is manually navigated along the route to develop a characterization of the route. The characterization is progressively updated with repeated manual navigations along the route, and autonomous navigation of the route is enabled when a confidence indicator of the characterization meets a threshold indication. Characterizations can be updated in response to the vehicle encountering changes in the route and can include a set of driving rules associated with the route, where the driving rules are developed based on monitoring the navigation of one or more vehicles of the route. Characterizations can be uploaded to a remote system which processes data to develop and refine route character- (Continued)

izations and provide characterizations to one or more vehicles.

20 Claims, 15 Drawing Sheets

(51) Int. Cl.
    *G01C 21/34*     (2006.01)
    *B60W 50/00*     (2006.01)

(52) U.S. Cl.
    CPC ......... *G05D 1/0221* (2013.01); *G05D 1/0276* (2013.01); *B60W 2050/0089* (2013.01); *B60W 2550/402* (2013.01); *B60W 2750/40* (2013.01); *G05D 2201/0213* (2013.01)

(58) Field of Classification Search
    USPC .......................................................... 701/26
    See application file for complete search history.

(56) References Cited

U.S. PATENT DOCUMENTS

| | | | | |
|---|---|---|---|---|
| 9,507,346 | B1* | 11/2016 | Levinson | G05D 1/0214 |
| 9,612,123 | B1* | 4/2017 | Levinson | G01C 21/32 |
| 2007/0198177 | A1 | 8/2007 | Yamada | |
| 2007/0219720 | A1* | 9/2007 | Trepagnier | B60W 30/00 701/300 |
| 2008/0009965 | A1* | 1/2008 | Bruemmer | G05D 1/0088 700/245 |
| 2010/0106356 | A1* | 4/2010 | Trepagnier | G01S 17/023 701/25 |
| 2011/0106339 | A1* | 5/2011 | Phillips | G05D 1/0033 701/2 |
| 2013/0211656 | A1 | 8/2013 | An et al. | |
| 2013/0231824 | A1 | 9/2013 | Wilson et al. | |
| 2014/0136414 | A1* | 5/2014 | Abhyanker | G06Q 50/28 705/44 |
| 2014/0195213 | A1 | 7/2014 | Kozloski et al. | |
| 2014/0244096 | A1 | 8/2014 | An et al. | |
| 2014/0309920 | A1* | 10/2014 | Ricci | H04W 4/21 701/400 |
| 2016/0216130 | A1* | 7/2016 | Abramson | G01C 21/3626 |
| 2017/0067747 | A1* | 3/2017 | Ricci | H04W 4/21 |
| 2017/0123422 | A1* | 5/2017 | Kentley | B60H 1/00735 |
| 2017/0343360 | A1* | 11/2017 | Harikrishnan | G01C 21/28 |
| 2018/0023960 | A1* | 1/2018 | Fridman | G08G 1/096725 382/104 |
| 2018/0136651 | A1* | 5/2018 | Levinson | G05D 1/0044 |
| 2018/0201138 | A1* | 7/2018 | Yellambalase | B60L 3/0046 |
| 2018/0237005 | A1* | 8/2018 | Duan | B60W 30/09 |

\* cited by examiner

AUTONOMOUS NAVIGATION SYSTEM

This application is a continuation of International Application No. PCT/US2015/064059, filed Dec. 4, 2015, which claims priority to U.S. Provisional Patent Application No. 62/088,428, filed Dec. 5, 2014, which are hereby incorporated by reference herein in their entirety.

BACKGROUND

Technical Field

This disclosure relates generally to autonomous navigation of a vehicle, and in particular to development and evaluation of an autonomous navigation route characterization which can be utilized by at least some portion of a vehicle to autonomously navigate the route.

Description of the Related Art

The rise of interest autonomous navigation of vehicles, including automobiles, has resulted in a desire to develop autonomous navigation systems which can autonomously navigate (i.e., autonomously "drive") a vehicle through various routes, including one or more roads in a road network, such as contemporary roads, streets, highways, etc. However, systems which can enable autonomous navigation, also referred to as autonomous driving, of a vehicle can be less than ideal.

In some cases, autonomous navigation is enabled via an autonomous navigation system which can process and respond to static features (e.g., roadway lanes, road signs, etc.) and dynamic features (present locations of other vehicles in a roadway on which the route extends, present environmental conditions, roadway obstructions, etc.) along a route in real-time as they are encountered, thereby replicating the real-time processing and driving capabilities of a human being. However, the processing and control capabilities required to simulate such processing and responsive capability can be impractical, if technically feasible, and the complexity and magnitude of computer systems required to be included in a vehicle to enable such real-time processing and responsiveness can present an unsuitably excessive investment in capital costs for each vehicle, thereby rendering the system impractical for usage on a wide scale.

In some cases, autonomous navigation is enabled by developing a detailed map of various routes, including data indicating various features of the road (e.g., road signs, intersections, etc.), specifying various driving rules relative to the various routes (e.g., proper speed limits, lane changing speeds, lane locations, variations of driving rules based on various climate conditions and times of day, etc. for a given portion of a given route), and providing the map to autonomous navigation systems of various vehicles to enable the vehicles to autonomously navigate the various routes using the map.

However, development of such a map can require extensive expenditures of time and effort, as developing sufficient data for an individual route can require dispatching a suite of sensors, which can be mounted in a dedicated sensor vehicle, to traverse a route and collect data regarding the various features included in the route, processing the collected data to develop a "map" of the route, determining appropriate driving rules for various portions of the route, and repeating the process for each of the individual routes included in the map. Such a process can require an excessive expenditure of time and effort to develop a map characterizing multiple routes, particularly when the multiple routes span over some or all of the roadways in a major city, region, nation, etc.

In addition, as roadways can change over time, e.g. due to road construction, accidents, weather, seasonal occurrences, etc. such a map can unexpectedly become obsolete and unusable for safe autonomous navigation of a route. Updating a map can require dispatching a sensor suite to re-traverse the route, which can require an expenditure of time. When such an expenditure is considered in view of the sheer volume of potential routes in a roadway network, particularly if multiple routes require updating simultaneously, updating a map of routes in a timely manner, such that vehicle users are not deprived of safe autonomous navigation capabilities, can be difficult.

SUMMARY OF EMBODIMENTS

Some embodiments provide a vehicle configured to autonomously navigate a driving route. The vehicle includes sensor devices which monitor characteristics of the driving route based on the vehicle being navigated along the driving route, and an autonomous navigation system which is interoperable with the sensor devices to: implement a succession of updates to a virtual characterization of the driving route, based on monitoring a succession of manual navigations of the vehicle along the driving route, associate a confidence indicator with the virtual characterization, based on monitoring the succession of updates to the virtual characterization, and enable autonomous navigation of the vehicle along the driving route, based at least in part upon a determination that the confidence indicator at least meets a threshold confidence indication, such that the autonomous navigation system autonomously navigates the vehicle along at least a portion of the driving route, based on controlling one or more control elements of the vehicle and based on a user-initiated command, received at the autonomous navigation system via a user interface of the vehicle, to engage in autonomous navigation of the portion of the driving route.

Some embodiments provide an apparatus which includes an autonomous navigation system configured to be installed in a vehicle and selectively enable autonomous navigation of the vehicle along a driving route. The autonomous navigation system can include a route characterization module which implements a succession of updates to a virtual characterization of the driving route, wherein each update is based on monitoring a separate one of a succession of manually-controlled navigations of the vehicle along the driving route, and implementing each update of the succession of updates includes associating a confidence indicator with the virtual characterization based on a monitored variation, of the virtual characterization which is associated with the respective update. The autonomous navigation system can include a route evaluation module configured to enable user-initiated autonomous navigation of the driving route by the vehicle, based on a determination that a confidence indicator associated with the characterization of the driving route exceeds a threshold confidence indication.

Some embodiments provide a method which includes performing, by one or more computer systems installed in a vehicle: receiving a set of sensor data associated with a driving route, from a set of sensors included in the vehicle, based at least in part upon the vehicle being manually navigated along the driving route, processing the set of sensor data to update a stored characterization of the driving route, wherein the stored characterization is based on at least one previously-generated set of sensor data associated with one or more historical manual navigations of the vehicle along the driving route associating a confidence indicator with the updated characterization based on a comparison of the updated characterization with the stored characterization, and enabling availability of user-initiated autonomous navigation, by the vehicle, of the driving route, based at least in part upon a determination that the confidence indicator at least meets a predetermined threshold confidence indication.

Figure 1:
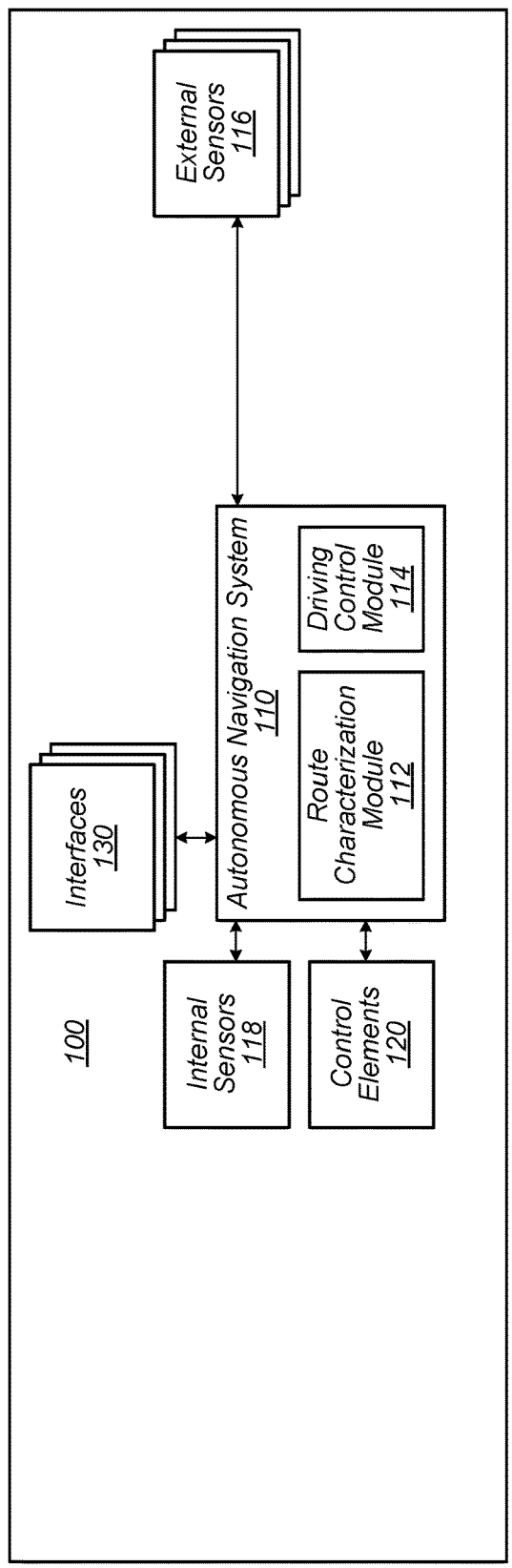
FIG. 1 illustrates a schematic block diagram of a vehicle 100 which comprises an autonomous navigation system (ANS), according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments include one or more vehicles in which an autonomous navigation system ("ANS") is included, where the ANS enables autonomous navigation of various driving routes (also referred to herein as "routes") via developing a virtual characterization of the routes based on monitoring various real-world features of the routes during navigation of the vehicle along the routes. The ANS controls various control elements of a vehicle to autonomously drive the vehicle (herein referred to as "autonomously navigate", "autonomous navigation", etc.) along one or more portions of a route based at least in part upon virtual characterizations of the one or more portions of the route. Such autonomous navigation can include controlling vehicle control elements based on characterizations of driving rules included in the virtual route characterizations (e.g., vehicle velocity, spacing relative to other vehicles, position on a roadway, adjustments to same based on environmental conditions, etc.) and characterizations of static features of the route included in the virtual route characterizations (positions of roadway lanes, roadway edges, road signs, landmarks, roadway inclines, intersections, crosswalks, etc.), so that the ANS can safely autonomously navigate the vehicle along at least a portion of a route.

As referred to herein, a "route" includes a pathway along which a vehicle is navigated. A route can extend from a starting location to another separate destination location, extend back to a destination location which is the same as the starting location, etc. A route can extend along one or more various portions of one or more various roadways. For example, a route between a home location and a work location can extend from a home driveway, through one or more residential streets, along one or more portions of one or more avenues, highways, toll ways, etc., and to one or more parking spaces in one or more parking areas. Such routes can be routes which a user repeatedly navigates over time, including multiple times in a given day (e.g., routes between home and work locations may be travelled at least once in a given day).

In some embodiments, an ANS in a vehicle enables autonomous navigation of one or more portions of a route, based at least in part upon virtual characterizations of the one or more portions. Enabling autonomous navigation can include making autonomous navigation of one or more portions of a route available for selection by a user of the vehicle, such that the ANS can engage in autonomous navigation of the one or more portions based on receiving a user-initiated command to engage in the autonomous navigation of the one or more portions.

A virtual characterization of a route portion, referred to herein as a "virtual route portion characterization", can include a virtual characterization of a portion of a roadway which is included in a route between one or more locations. Such a characterization can be referred to as a "virtual roadway portion characterization". A given virtual roadway portion characterization can be independent of any overall routes which can be navigated by a vehicle, so that a route navigated by a vehicle includes a set of roadway portions navigated in series, and one or more virtual roadway portion characterizations can be used by the ANS to autonomously navigate a vehicle along one or more various routes. A virtual route characterization can include a set of one or more virtual roadway portion characterizations associated with a set of one or more roadway portions for which autonomous navigation is enabled and one or more roadway portions for which autonomous navigation is not enabled, and the ANS can engage in autonomous navigation of the portions for which autonomous navigation is enabled, interacting with a vehicle user, via a user interface of the vehicle, such that control of various control elements of the vehicle are transferred between the user and the ANS based upon which roadway portions along the route the vehicle is navigated.

In some embodiments, the ANS develops virtual roadway portion characterizations, virtual route characterizations, etc. via monitoring the navigation of a vehicle in which the ANS is included along one or more routes. Such monitoring can include monitoring one or more of the external environment, vehicle control elements, etc. as the vehicle is manually navigated by a user along the one or more routes. As referred to herein, a user can include a driver of the vehicle, a passenger of the vehicle, some combination thereof, etc. As the user manually navigates the vehicle along a route, which can extend along one or more roadway portions, the ANS can monitor various aspects of the manual navigation, including monitoring various static features (e.g., road signs, curbs, lane markers, stoplights, trees, landmarks, physical location of the vehicle, etc.) encountered in various roadway portions through which the vehicle is manually navigated, dynamic features (other vehicles navigating along the roadways, emergency vehicles, accidents, weather conditions, etc.) encountered in various roadway portions, driving characteristics of the user with regard to manual navigation of the vehicle (e.g., driving speed at various portions of the route, lane changing speed and operations, acceleration events and rates, deceleration events and rates, position on the roadway relative to static features, spacing from other vehicles, etc.) through various roadway portions, driving characteristics of mobile entities navigating through various roadway portions in proximity to the manually-navigated vehicle (e.g., in different lanes, ahead or behind the vehicle, etc.), some combination thereof, and the like. As used herein, a "mobile entity" can include a motorized vehicle, including an automobile, truck, etc.; a manually-powered vehicle, including a bicycle, pedicab, etc.; a pedestrian, including a human, animal, etc.; some combination thereof, etc. A driving characteristic of a mobile entity, including a vehicle, pedestrian, etc., can include data characterizing how the mobile entity navigates at least a portion of one or more roadway portions. For example, a driving characteristic of a pedestrian can indicate that the pedestrian travels along a roadway, within a certain distance of a certain edge of the roadway, at a certain speed. The system can process input data, generated at various vehicle sensors based on the monitoring, to develop a virtual characterization of the route, which can include characterizations of the static features associated with various portions of the route (referred to herein as "static feature characterizations"), characterizations of driving rules associated with various portions of the route (referred to herein as "driving rule characterizations"), etc.

In some embodiments, the ANS updates one or more virtual roadway portion characterizations of one or more roadway portions included in a route based upon monitoring successive manual navigations of the route. As the ANS implements successive updates of a virtual characterization of one or more roadway portions, based on multiple, successive navigations of the route, the ANS can develop and update a confidence indicator associated with one or more roadway portion characterizations associated with one or more roadway portions included in the route. For example, where the number of new static features in a roadway portion in a routinely-navigated route, identified based on processing input data from various vehicle sensors, decreases with monitoring successive manual navigations over the route, the confidence indicator associated with that virtual roadway portion characterization can increase with the successive monitoring of navigation through the roadway portion. When a characterization of one or more roadway portions has a confidence indicator which at least meets a threshold confidence indication, the ANS can enable an autonomous navigation feature of the vehicle for the one or more roadway portions, so that autonomous navigation of the vehicle along one or more portions of a route which include the one or more roadway portions is enabled. The threshold level can be predetermined. In some embodiments, the ANS can adjustably establish a confidence indicator for one or more particular roadway portions, based at least upon monitoring of navigation along the one or more particular roadway portions, signals received from one or more remote services, systems, etc., some combination thereof, or the like.

As used herein, an indicator can include one or more of a particular value, rank, level, some combination thereof, etc. For example, a confidence indicator can include one or more of a confidence value, confidence rank, confidence level, some combination thereof, etc. Where the indicator includes one or more of a particular value, rank, level, some combination thereof, etc., the indicator can include one or more of a range of indicators. For example, where the confidence indicator includes a confidence rank, the confidence indicator can include a particular rank of a range of ranks, where the particular rank indicates the relative confidence associated with the indicator. In another example, where the confidence indicator includes a confidence value, the confidence indicator can include a particular value of a range of value, where the particular value within the range indicates the relative confidence associated with the indicator, relative to one or more confidence extremes represented by the range extremes.

In some embodiments, the threshold confidence indication can include one or more indicators, values, ranks, levels, etc., and determining that a confidence indicator at least meets a threshold confidence indication can include determining that a value, rank, level, etc. included in the confidence indication at least matches a value, rank, level, etc. included in the confidence indication. In some embodiments, determining that a confidence indicator at least meets a threshold confidence indication can include determining that a value, rank, level, etc. included in the confidence indication exceeds a value, rank, level, etc. included in the confidence indication. The threshold confidence indication can, in some embodiments, be referred to as one or more of a threshold confidence indicator, threshold value, threshold rank, threshold level, some combination thereof, etc.

A virtual route characterization can include a set of virtual roadway portion characterizations of the various roadway portions included in the route. The virtual route characterization can include metadata referencing the various virtual roadway portion characterizations and can characterize driving rules associated with navigating between various roadway portions. In some embodiments, autonomous navigation of one or more portions of a route is enabled based at least in part upon a determination that sufficiently large portions of the route, including a set of one or more roadway portions, have associated virtual characterizations for which associated confidence indicators at least meet one or more thresholds. Such a set of roadway portions can include a limited selection of the roadway portions included in the route. For example, where a route includes multiple roadway portions which are 100 feet in length, and a virtual roadway portion characterization associated with a single roadway portion has a confidence indicator which meets the threshold confidence indication while the remainder of roadway portion characterizations do not, autonomous navigation of the single roadway portion may remain disabled. In another example, where the virtual roadway portion characterization associated with multiple contiguous roadway portions each have a confidence indicator which meets the threshold and the contiguous length of the roadway portions at least meets a threshold confidence indication, autonomous navigation of the portion of the route which includes the multiple contiguous roadway portions can be enabled. A "threshold confidence indication" is referred to interchangeably herein as a "threshold". The threshold can be based at least in part upon one or more of the distance of the contiguous roadway portions, driving velocity through the one or more roadway portions, estimated elapsed time of navigation through the one or more roadway portions, some combination thereof, etc. The threshold can vary based on various roadway portions included in a route portion for which a determination of whether to enable autonomous navigation is made.

In some embodiments, enabling autonomous navigation of one or more portions of a route enables user-initiated engaging of autonomous navigation through one or more particular roadway portions specified based on user interaction with one or more user interfaces. For example, in response to autonomous navigation of a roadway portion being enabled, the ANS can present to a user, via a user interface included in a vehicle, an option to engage autonomous navigation of the vehicle over one or more route portions which includes the one or more roadway portions for which autonomous navigation is enabled. Based on a user interaction with the user interface, the ANS can receive a user-initiated command to autonomously navigate the vehicle along one or more portions of a route and, in response, engage in the autonomous navigation via controlling one or more control elements of the vehicle.

The ANS can update a virtual characterization of a route in response to detecting, via monitoring of the external environment, a change in the static features of a route. For example, where a portion of a roadway in a route routinely travelled by a vehicle undergoes road construction which results in an alteration to the roadway, lane closure, etc., the ANS included in the vehicle can update a characterization of the route in response to monitoring the roadway portion as the vehicle travels through the portion. As a result, the ANS can adapt to changes in a route independently of preexisting route characterizations, "maps", etc., including independently of data received from a remote service, system, etc., thereby reducing the amount of time required to enable autonomous navigation of the changed route. Furthermore, because route characterizations are developed by an ANS of a vehicle based on routes which are successively (i.e., repeatedly) navigated by a user of the vehicle, the routes for which autonomous navigation can be enabled include routes which the user of the vehicle tends to navigate, including routinely-navigated routes. As a result, the ANS can autonomously navigate routes routinely navigated by a vehicle user without requiring preexisting route characterizations. In addition, because the ANS can update virtual characterization of one or more roadway portions, routes, etc. based on locally-monitoring changes in the roadway portions via sensors included in the vehicle, the ANS can update the characterizations as soon as the changes are encountered by the vehicle, thereby providing updates to virtual characterizations of routes which are navigated by a user and, in some embodiments, without relying upon distributed update information from remote systems, services, etc. In some embodiments, an ANS can continue to update virtual characterizations of a roadway portion based on monitoring an autonomous navigation of a vehicle through the roadway portion.

In some embodiments, the ANS uploads virtual characterizations of one or more routes to one or more remote system, service, etc. implemented on one or more computer systems which are external to the vehicle in which the ANS is located. Such uploading can be performed in response to a determination that developing a virtual characterization with sufficient confidence to enable autonomous navigation of the route requires processing resources not available locally to the vehicle, in response to a determination that the ANS is unable to build the confidence indicator associated with a characterization at more than a certain rate with successive monitoring of route navigation, etc. For example, where characterization of a roadway portion requires processing capabilities which are beyond the capabilities of computer systems included in a vehicle, an ANS included in the vehicle can upload the characterization of a route, one or more sets of input data associated with the route, etc. to a remote service, and the remote service can process the data, evaluate the characterization, etc. to develop a virtual characterization of the route. In another example, where an ANS of a vehicle determines that the confidence indicator associated with a virtual roadway portion characterization does not increase at more than a certain rate with successive monitoring of navigation of the roadway portion, the ANS can upload the characterization, input data associated with the route, etc. to a remote service, system, etc. and the remote service, system, etc. can further evaluate the characterization to augment the confidence indicator of the characterization.

Where the remote system, service, etc. is unable to establish a sufficient confidence indicator for a characterization, the remote system can flag the characterization for manual evaluation of the characterization and can modify the characterization in response to manual inputs from one or more operators. In some embodiments, a manual input can include a manually-specified confidence indicator of the characterization. Where such modification does not result in establishing a sufficient confidence indicator of the characterization, the remote system can dispatch a dedicated sensor suite, which can be included in a dedicated sensor-bearing vehicle, to collect additional input data associated with one or more selected portions of the route in question, where the remote system can utilize the additional input data to modify the characterization. Where such modification does not result in establishing a sufficient confidence indicator of the characterization, the remote system can flag the route and provide, to the ANS, proposed alternative routes for the vehicle to navigate.

Alternative route proposals can include characterizations of one or more of the alternative routes which can have sufficient confidence indicators that the ANSs of the vehicle can enable autonomous navigation of said alternative routes and propose to a user of the vehicle, via an interface, engaging of autonomous navigation of the alternative route rather than travel the first route. In some embodiments, the ANS invites the user of the vehicle, via a user interface, to manually navigate one or more alternative routes, so that the ANS can develop virtual characterizations of the one or more alternative route as part of enabling autonomous navigation of the one or more alternative routes.

In some embodiments, characterizing a route at an ANS of a vehicle includes monitoring driving characteristics of one or more users of the vehicle in manually navigating the vehicle along one or more portions of the route. Such characterization can include monitoring driving characteristics of one or more various mobile entities, including one or more motorized vehicles, manually-powered vehicles, pedestrians, some combination thereof, etc. travelling one or more portions of the route in proximity to the vehicle. Driving characteristics can include positioning of one or more mobile entities relative to one or more static route features along the route, acceleration events relative to static route features, acceleration rates, driving velocities relative to static features, dynamic features, etc. in one or more portions of a route, etc. The ANS can process the monitored driving characteristics to develop a set of driving rules associated with one or more portions of the route, where the set of driving rules determines the driving characteristics according to which the ANS autonomously navigates the vehicle along the one or more portions of the route. For example, based on monitoring driving characteristics of a user of the local vehicle, driving characteristics of various other vehicles, etc. along a particular route, an ANS of the vehicle can develop a set of driving rules associated with the route which can include rules specifying driving velocity ranges along various portions of the route, locations of lanes along the route, permissible spacing distances between the vehicle and other vehicles along the route, locations along the route where particular acceleration rates ranges are permitted, locations where an amount of acceleration is to be applied (e.g., a roadway incline), likelihood of certain dynamic event occurrences (accidents, abrupt acceleration events, roadway obstructions, pedestrians, etc.), some combination thereof, etc. Such sets of driving rules can be referred to as driving rule characterizations and can be included in a virtual roadway portion characterization, virtual route characterization, some combination thereof, etc.

As a result, driving rules for a route can be developed "experientially", i.e., based on monitoring how one or more users actually navigate one or more vehicles along the route. Such locally-developed driving rules can provide an autonomous driving experience which is tailored to the particular conditions of the route being autonomously navigated, rather than using general driving rules developed independently of direct monitoring of how the route is actually navigated by vehicle users. In addition, in some embodiments, driving characteristics can be processed to develop characterizations of static features included in one or more portions of a route. For example, monitoring of driving characteristics, of the local vehicle and one or more various external vehicles, when the vehicles are navigating over a roadway which lacks at least some conventional static features (e.g., an unpaved roadway which lacks one or more of defined roadway edges, lane boundary markers, etc.) can be processed to develop one or more static feature characterizations, including a characterization of the edges of the roadway, a characterization of the boundaries of the unmarked lanes of the roadway, etc.

Driving rule characterizations can be subject to predetermined driving constraints, including driving velocity limits. For example, based on processing input data generated from monitoring of external environment elements, the ANS can identify road signs, along various portions of a route, which specify a speed limit for the roadway over which that portion of the route extends. The ANS can analyze the input data associated with the monitoring of the road sign to identify the indicated speed limit and incorporate the identified speed limit as a driving velocity limit in the driving rules associated with that portion of the route, so that the ANS, when using the driving rule characterizations to autonomously navigate along at least that portion of the route, will at least attempt to not exceed the speed limit associated with that portion of the route.

In some embodiments, multiple virtual roadway portion characterizations included in multiple navigated routes can be developed at a vehicle, and such multiple characterizations can be incorporated into a set of roadway portion characterizations, of various portions of multiple different roadways navigated via navigation of multiple various routes, where the various characterizations of the multiple roadway portions can be used by the ANS to enable autonomous navigation along various portions of various routes, including portions of multiple separate routes.

In some embodiments, virtual characterizations of one or more roadway portions can be uploaded from one or more ANSs, included in one or more vehicles, to a remote system, service, etc. Such a system can include a navigation monitoring system, where multiple ANSs of multiple separate vehicles are communicatively coupled to one or more navigation monitoring system in a navigation network. The various characterizations of various roadway portions can be incorporated, at the remote system, service, etc. into a "map" of roadway portion characterizations. The characterization map can be distributed to the various ANSs of the various vehicles. Where multiple roadway portion characterizations of one or more portions of a common roadway portion are received at the remote system, service, etc., incorporating the characterizations into a map can include developing a composite characterization of the roadway portion based on processing the multiple characterizations of the one or more portions. As a result, ANSs of various vehicles can characterize various routes travelled by those respective vehicles, and the various route characterizations developed locally at the various vehicles can be incorporated into a characterization map of route characterizations which can be distributed to other vehicles and utilized by ANSs of the other vehicles to enable autonomous navigation of the other vehicles over the various routes.

The ANS included in a vehicle can develop the virtual characterization at least partially locally to the vehicle, based on local monitoring of the environment proximate to the vehicle, thereby precluding a need for a preexisting detailed "map" of roadway portions included in a roadway network, where a map can include a set of virtual characterizations of the roadway portions organized and arranged in accordance with their relative physical, geographic locations, such that the map includes a virtual characterization of the roadway network and the various routes which can be navigated therein. Where a "map" is absent, the ANS can "bootstrap" a map into existence via developing virtual characterizations of one or more portions of one or more routes which the vehicle is navigated. In addition, because the ANS characterizes routes which a vehicle navigates, a locally-developed map of characterized routes can include routes which a user of the vehicle tends to navigate, at the expense of routes which the user does not navigate, thereby enabling autonomous navigation of routes which a user routinely travels.

In some embodiments, an ANS is communicatively coupled to one or more other ANSs and can communicate virtual route characterizations with the one or more other autonomous navigation systems. The ANS can be implemented by one or more computer systems external to one or more vehicles and can modify virtual route characterizations received from one or more other ANSs. Such modification can include incorporating multiple characterizations into one or more composite characterizations, modifying characterizations received from one or more sets of remote ANSs based on input data received from one or more other sets of remote ANSs, some combination thereof, etc.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Autonomous Navigation System

FIG. 1 illustrates a schematic block diagram of a vehicle 100 which comprises an autonomous navigation system (ANS) which is configured to control various control elements of the vehicle to autonomously navigate the vehicle along one or more driving routes, based at least in part upon one or more virtual characterizations of one or more portions of the one or more driving routes, according to some embodiments.

Vehicle 100 will be understood to encompass one or more vehicles of one or more various configurations which can accommodate one or more occupants, including, without limitation, one or more automobiles, trucks, vans, etc. Vehicle 100 can include one or more interior cabins configured to accommodate one or more human occupants (e.g., passengers, drivers, etc.), which are collectively referred to herein as vehicle "users". An interior cabin can include one or more user interfaces, including vehicle control interfaces (e.g., steering wheel, throttle control device, brake control device), display interfaces, multimedia interfaces, climate control interfaces, some combination thereof, or the like. Vehicle 100 includes various control elements 120 which can be controlled to navigate ("drive") the vehicle 100 through the world, including navigate the vehicle 100 along one or more routes. In some embodiments, one or more control elements 120 are communicatively coupled to one or more user interfaces included in an interior cabin of the vehicle 100, such that the vehicle 100 is configured to enable a user to interact with one or more user interfaces to control at least some of the control elements 120 and manually navigate the vehicle 100. For example, vehicle 100 can include, in the interior cabin, a steering device, throttle device, and brake device which can be interacted with by a user to control various control elements 120 to manually navigate the vehicle 100.

Vehicle 100 includes an autonomous navigation system (ANS) 110 which is configured to autonomously navigate vehicle 100. ANS 110 may be implemented by any combination of hardware and/or software configured to perform the various features, modules or other components discussed below. For example, one or more multiple general processors, graphical processing units, or dedicated hardware components, such as various kinds of application specific integrated circuits (ASICs), field programmable gate arrays (FPGAs), or other dedicated circuitry may implement all (or portions in conjunction with program instructions stored in a memory and executed by the processors) of route characterization module 112 and driving control module 114. One or multiple computing systems, such as computer system 1300 in FIG. 13 below may also implement ANS 110. ANS 110 is communicatively coupled to at least some of the control elements 120 of the vehicle and is configured to control one or more of the elements 120 to autonomously navigate the vehicle 100. As used herein, autonomous navigation of the vehicle 100 refers to controlled navigation ("driving") of vehicle 100 along at least a portion of a route based upon active control of the control elements 120 of the vehicle 100, including steering control elements, throttle control elements, braking control elements, transmission control elements, etc. independently of control element input commands from a user of the vehicle. Autonomous navigation can include ANS active control of driving control elements 120 while enabling manual override of control of elements 120 via manual input from a user via user interaction with one or more user interfaces included in the vehicle. For example, ANS 110 can autonomously navigate vehicle 100 in the absence of input commands from a vehicle user via one or more user interfaces of the vehicle 100, and ANS 110 can cease control of one or more elements 120 in response to a user-initiated input command to the one or more elements 120 from one or more user elements of the vehicle 100.

ANS 110 includes a route characterization module 112 which develops and maintains virtual characterizations of various roadway portions, driving routes, etc. and a driving control module 114 which is configured to control one or more control elements 120 of the vehicle 100 to autonomously navigate the vehicle 100 along one or more portions of one or more driving routes based on the virtual characterizations associated with the one or more portions of the route.

Vehicle 100 includes a set of one or more external sensor devices 116, also referred to as external sensors 116, which can monitor one or more aspects of an external environment relative to the vehicle 100. Such sensors can include camera devices, video recording devices, infrared sensor devices, radar devices, light-scanning devices including LIDAR devices, precipitation sensor devices, ambient wind sensor devices, ambient temperature sensor devices, position-monitoring devices which can include one or more global navigation satellite system devices (e.g., GPS, BeiDou, DORIS, Galileo, GLONASS, etc.), some combination thereof, or the like. One or more of external sensor devices 116 can generate sensor data associated with an environment as the vehicle 100 navigates through the environment. Sensor data generated by one or more sensor devices 116 can be communicated to ANS 110 as input data, where the input data can be used by the route characterization module 112 to develop, update, maintain, etc. a virtual characterization of one or more portions of the routes through which the vehicle 100 is being navigated. External sensor devices 116 can generate sensor data when the vehicle 100 is being manually navigated, autonomously navigated, etc.

Vehicle 100 includes a set of one or more internal sensors 118, also referred to as internal sensor devices 118, which can monitor one or more aspects of vehicle 100. Such sensors can include camera devices configured to collect image data of one or more users in the interior cabin of the vehicle, control element sensors which monitor operating states of various control elements 120 of the vehicle, accelerometers, velocity sensors, component sensors which monitor states of various automotive components (e.g., sensors which monitor wheel-turning dynamics of one or more wheels of the vehicle), etc. One or more of internal sensor devices 118 can generate sensor data associated with the vehicle 100 as the vehicle 100 navigates through the environment. Sensor data generated by one or more internal sensor devices 118 can be communicated to ANS 110 as input data, where the input data can be used by the route characterization module to develop, update, maintain, etc. a virtual characterization of one or more portions of the routes through which the vehicle 100 is being navigated. Internal sensor devices 118 can generate sensor data when the vehicle 100 is being manually navigated, autonomously navigated, etc.

Vehicle 100 includes one or more sets of interfaces 130. One or more interfaces 130 can include one or more user interface devices, also referred to as user interfaces, with which a user of vehicle 100 can interact to interact with one or more portions of ANS 100, control elements 120, etc. For example, an interface 130 can include a display interface with which a user can interact to command ANS 110 to engage autonomous navigation of vehicle 100 along one or more particular routes, based at least in part upon one or more virtual characterizations of one or more portions of the route.

In some embodiments, one or more interfaces 130 includes one or more communication interfaces which can communicatively couple ANS 110 with one or more remote services, systems, etc. via one or more communication networks. For example, an interface 130 can include a wireless communication transceiver which can communicatively couple ANS 110 with one or more remote services via one or more wireless communication networks, including a cloud service. ANS 110 can communicate virtual route characterizations, various sets of input data, etc. to a remote service, system, etc. via one or more interfaces 130, receive virtual characterizations of one or more roadway portions, etc. from the one or more remote services, systems, etc., and the like.

Route Characterization Development

In some embodiments, an ANS can develop one or more virtual characterizations of one or more roadway portions, which the ANS can subsequently utilize to autonomously navigate a vehicle through the one or more roadway portions, based on monitoring various static features, dynamic features, driving characteristics, etc. while the vehicle is navigated through the one or more roadway portions. Such monitoring can be implemented when the vehicle is manually navigated through the one or more roadway portions by a vehicle user, such that the ANS can develop a characterization of the static features of a route by monitoring the static features when the vehicle is manually navigated along the route and can develop a set of driving rules specifying how ANS is to navigate a vehicle through the one or more roadway portions based on monitoring driving characteristics of the user's manual navigation of the vehicle through the roadway portion, monitoring driving characteristics of other vehicles navigating through the roadway portion in proximity to the local vehicle, etc. As a result, a vehicle ANS can both develop a characterization of the physical state of the route (e.g. static features) and a characterization of how to navigate along the route (e.g., driving rules) based on monitoring a manual navigation along the route and various features observed while the vehicle is manually navigated through the route. As a result, the ANS can develop characterizations used to engage in autonomous navigation of a route, independently of externally-received or preexisting characterization data.

Figure 2:
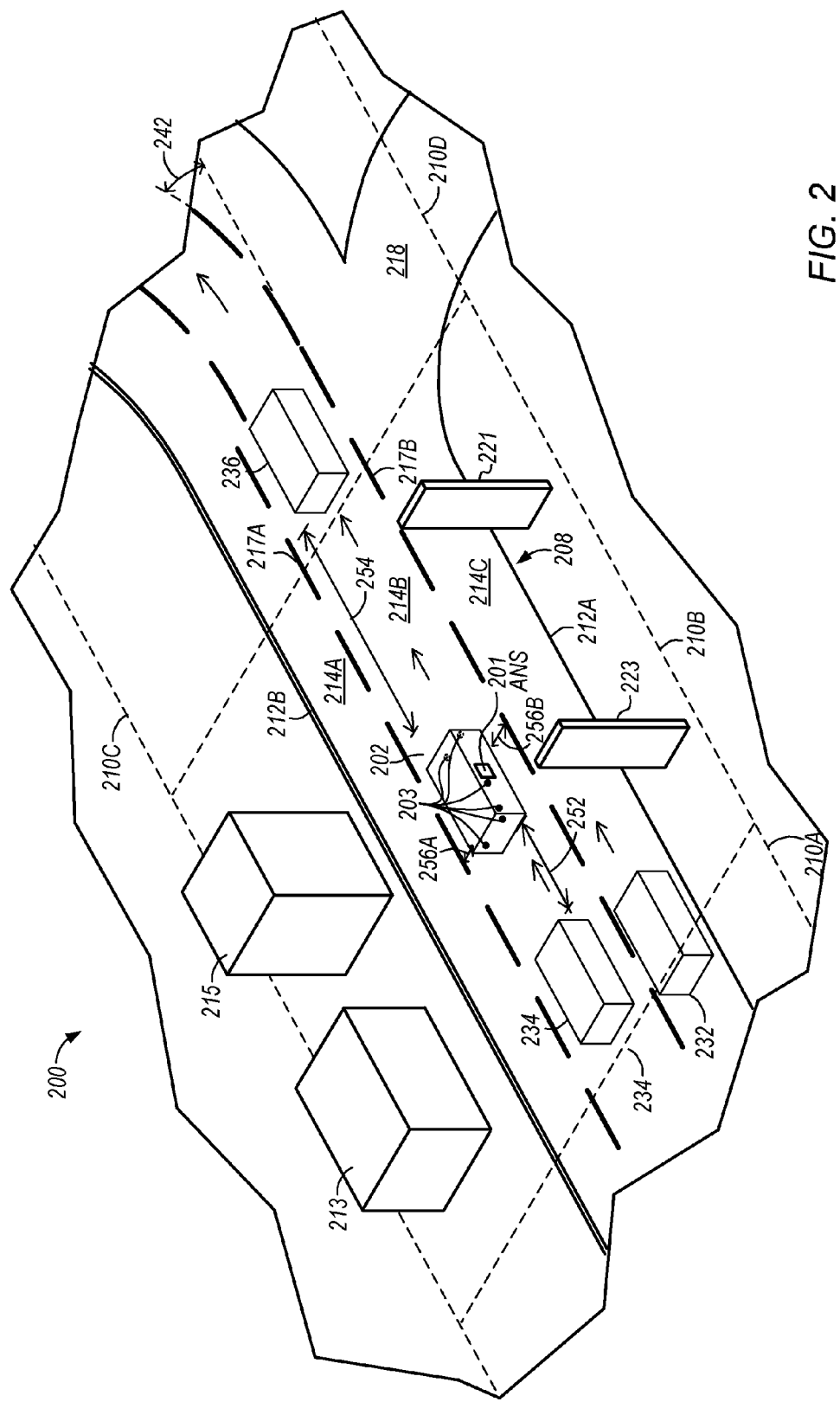
FIG. 2 illustrates an illustration of a vehicle, which includes an ANS and a set of sensor devices, navigating through a region which includes multiple roadway portions of multiple roadways, according to some embodiments.

FIG. 2 illustrates an illustration of a vehicle 202, which includes an ANS 201 and a set of sensor devices 203, navigating through a region 200 which includes multiple roadway portions 210A-D of roadways 208, 218, according to some embodiments. Vehicle 202 can be manually navigated through the route, and sensor devices 203 can include one or more external sensor devices, vehicle sensor devices, etc. Vehicle 202 and ANS 201 can be included in any of the embodiments of a vehicle, ANS, etc.

As shown in the illustrated embodiment, a region 200 which includes one or more various roadways 208, 218 can be divided into various roadway "portions" 210. An ANS can demarcate various roadway portions based on position data received from one or more position sensors in the vehicle 202, one or more various static features included in region 200, etc. Different roadway portions 210 can have different sizes, which can be based at least in part upon driving velocity of vehicles navigating the roadway in which the roadway portions are included, environmental conditions, etc. For example, roadway 208 can be a highway where the average driving velocity is higher than that of roadway 218 which can be an onramp; as a result, each of roadway portions 210A-C of roadway 208 can be larger than roadway portion 210D of roadway 218.

In some embodiments, as a vehicle is navigated (manually, autonomously, etc.) through one or more various roadways, an ANS included in the vehicle monitors various static feature characteristics of various roadway portions of the various roadways, monitors various driving characteristics of the vehicle user, other proximate vehicles, etc., as the vehicle navigates through the various roadway portions, some combination thereof, and the like. Such monitoring, which can be implemented by ANS based on input data received from sensors 203, can include processing the various characteristics to develop virtual characterizations of the one or more roadway portions through which the vehicle is navigated. The ANS can subsequently utilize the virtual characterizations to engage in autonomous navigation of the vehicle through the one or more roadway portions.

In some embodiments, monitoring of various static feature characteristics of a roadway portion includes identifying various static features associated with the roadway portion. For example, in the illustrated embodiment, where vehicle 202 is navigating through roadway portion 210B of roadway 208, sensor devices 203 can monitor various aspects of the external environment of region 200 to identify various static features associated with the roadway portion 210B, including the edges 212A-B, lane boundaries 217A-B, lanes 214A-C of roadway 208. In some embodiments, one or more sensor devices 203 can identify the material composition of one or more portions of roadway 208. For example, a sensor device 203 of vehicle 202 can include an internal sensor device which can monitor dynamics of the turning of the wheels of the vehicle 202 to determine whether the vehicle is presently navigating over an asphalt surface, gravel surface, concrete surface, dirt surface, etc.

In some embodiments, sensor devices 203 can monitor various aspects of the external environment of region 200 to identify various static features associated with the roadway portion 210B of roadway which are external to the roadway 208 itself, including static landmarks 213, natural environmental elements 215, road inclines 242, road signs 221, 223, etc.

In some embodiments, identifying a static feature includes identifying information associated with the static feature, including identifying information presented on a road sign. For example, region 200 includes road signs 221, 223, where road sign 221 indicates the presence of onramp 218 and road sign 223 is a speed limit sign which indicates a speed limit for at least roadway portion 210B. Monitoring static features associated with roadway portion 210B as vehicle 202 navigates through the portion 210B includes the ANS, based on monitoring the external environment in region 200, determining the physical location of road signs 221, 223 in the roadway portion 210B, identifying the information presented on the road signs 221, 223, and including such information as part of the virtual characterization of the roadway portion. For example, ANS 201 can, based on monitoring of region 200 by sensors 203 as vehicle 202 navigates through roadway portion 210B, identify the physical position of road sign 223 in portion 210B, identify that road sign 223 is a speed limit sign, identify the speed limit indicated by the road sign as 55 miles/hour, and incorporate such information into a driving rule characterization associated with at least the roadway portion 210B as a maximum driving velocity when navigating through at least portion 210B.

In some embodiments, sensor devices 203 can monitor driving characteristics of vehicle 202, other vehicles 232-236 navigating through roadway portions 210 proximate to vehicle 202, etc. Such driving characteristics can be utilized by ANS 201 to develop one or more portions of the virtual characterization of one or more roadway portions, including one or more static feature characterizations, driving rules, etc. For example, based on monitoring driving velocity of one or more of vehicle 202, vehicles 232-236, etc. navigating through roadway portions 210A-C, ANS 201 can determine a driving velocity range for autonomously navigating through the one or more roadway portions 210A-C. ANS 201 can determine, based on monitoring driving characteristics of the one or more vehicles 202, 232-236, a permissible range of acceleration rates associated with navigating through particular portions 210A-C, locations in the roadway portions where acceleration events are likely, a location of lanes 214A-C in the roadway, a permissible range of spacing distances 252, 254, between vehicle 202 and other vehicles navigating one or more roadway portions 210A-C in a common lane 214 as vehicle 202, a permissible range of spacing distances 256A-B between vehicle 202 and one or more boundaries of the lane 214B in which the vehicle 202 is navigating, etc.

In some embodiments, driving characteristics monitored while a vehicle navigates through a roadway portion are associated with one or more other roadway portions. For example, where ANS 201 monitors a spacing 252 between vehicle 202 and another following vehicle 234 when vehicle navigates through portion 210B, ANS 201 can develop a driving rule which specifies the spacing 252 as a minimum permissible spacing between vehicle 202 and a vehicle 236 ahead of vehicle 202 when vehicle 202 is navigating through roadway portions 210A and 210C. Such associating can be based at least in part upon similarities between roadway portions. For example, driving characteristics determined based on input data generated while vehicle 202 is navigating through one or more of roadway portions 210A-C can be used to develop driving rule characterizations included in virtual characterizations of any of similar roadway portions 210A-C while such driving characteristics are not used to develop driving rules included in the virtual characterization of dissimilar roadway portion 210D.

Figure 3:
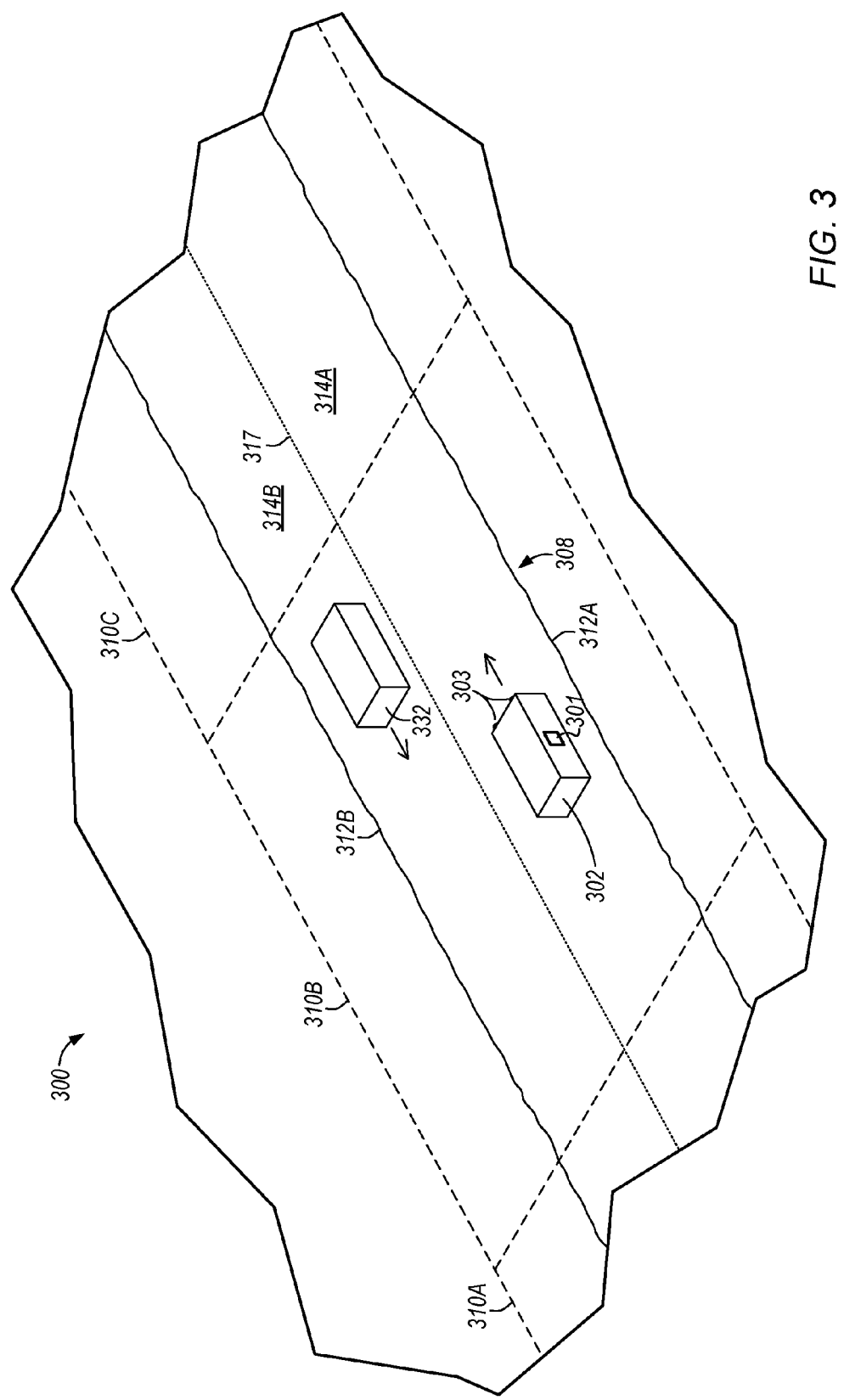
FIG. 3 illustrates an illustration of a vehicle, which includes an ANS and a set of sensor devices, navigating through a region which includes multiple roadway portions of a roadway, according to some embodiments.

FIG. 3 illustrates an illustration of a vehicle 302, which includes an ANS 301 and a set of sensor devices 303, navigating through a region 300 which includes multiple roadway portions 310A-C of roadways 208, 218, according to some embodiments. Vehicle 302 can be manually navigated through the route, and sensor devices 203 can include one or more external sensor devices, vehicle sensor devices, etc. Vehicle 302 and ANS 301 can be included in any of the embodiments of a vehicle, ANS, etc.

In some embodiments, an ANS can utilize monitored driving characteristics while a vehicle navigates through a roadway portion to determine static feature characteristics of the roadway portion, which are included in the virtual characterization of the roadway portion.

For example, in the illustrated embodiment of FIG. 3, vehicle 302 is navigating along an unpaved roadway 308 which lacks well-defined edges and lane boundaries. ANS 301 can determine edges 312A-B of the roadway 308, lanes 314A-B, and a lane boundary 317 based at least in part upon monitoring the driving characteristics of vehicle 302 when a user of vehicle 302 navigates the vehicle 302 through one or more roadway portions 310A-C, monitoring the driving characteristics of one or more other vehicles 332 when the other vehicle 332 navigates the vehicle 302 through one or more roadway portions 310A-C, some combination thereof, or the like. As shown, ANS 301 can determine, based on monitoring the driving characteristics of both vehicle 302 and vehicle 332, the edges 312A-B, lanes 314A-B, and boundary 317. In addition, ANS 301 can determine that lane 314B is associated with driving in an opposite direction, relative to driving in lane 314A.

Figure 4:
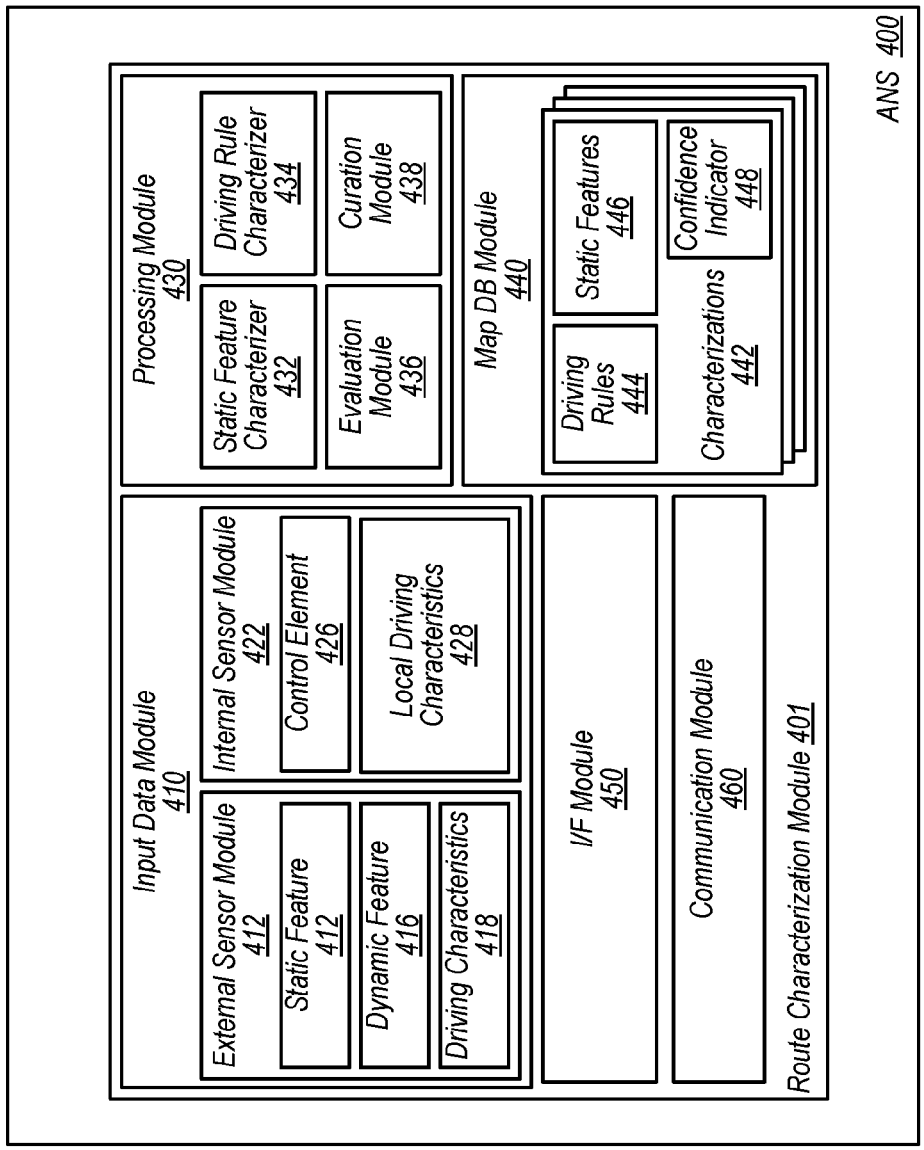
FIG. 4 illustrates a block diagram of an autonomous navigation system (ANS), according to some embodiments.

FIG. 4 illustrates a block diagram of an autonomous navigation system (ANS), according to some embodiments. As noted above with regard to FIG. 1, ANS 400 can be implemented by one or more computer systems and/or by any combination of hardware and/or software configured to perform the various features, modules or other components discussed below, such as one or more multiple general processors, graphical processing units, or dedicated hardware components, and can be included in any of the embodiments of ANSs.

ANS 400 includes various modules, which can be implemented by one or more instances of hardware, software, etc. ANS 400 comprises a route characterization module 401 which is configured to develop virtual characterizations of various roadway portions based on monitoring input data generated based on a vehicle in which the ANS 400 is included navigating through the various roadway portions.

ANS 400 includes an input data module 410 which is configured to receive input data from various data sources, which can include one or more sensor devices. In some embodiments, module 410 is configured to process at least some input data and determine various static feature characterizations, driving rule characterizations, etc. based on the one or more instances of input data. Input data can be received from various data sources based on a vehicle navigating one or more roadway portions, where such navigation can be manual, autonomous, some combination thereof, etc.

Input data module 410 includes an external sensor module 412 which is configured to receive input data from one or more external sensors of a vehicle, where the input data can be generated by the one or more external sensors concurrently with the vehicle navigating through one or more roadway portions along one or more driving routes.

Module 412 can include a static feature module 414 which monitors one or more static features included in one or more roadway portions as the vehicle navigates through the one or more roadway portions. Such monitoring can include determining a geographic location of a static feature, identifying information presented by the static feature, categorizing the static feature, etc. For example, module 414 can identify a roadway edge, lane boundary, road sign, etc. based on monitoring image data generated by a camera device monitoring the external environment of the vehicle.

In some embodiments, module 414 monitors the physical location (also referred to herein as the "geographic location", "geographic position", etc.) of vehicle 401 as the vehicle 401 navigates through the one or more roadway portions. Such monitoring can include determining a geographic location of the vehicle in which the ANS 400 is located based at least in part upon input data received from a global navigation satellite system device. Such physical location data can be used to develop static feature characterizations of the roadway portion through which the vehicle in which the ANS 400 is located is navigating, including the physical location of the roadway portion, driving rule characterizations of the roadway portion, including the driving velocity through the roadway portion, some combination thereof, etc.

Module 412 can include a dynamic feature module 416 which monitors one or more dynamic features encountered as the vehicle navigates through one or more roadway portions, including other vehicles navigating through the roadway portion, vehicles stopped in the roadway portion, emergency vehicles, vehicle accidents, pedestrians, ambient environmental conditions, visibility, etc. Based on the dynamic features encountered in one or more roadway portions, module 416 can develop one or more driving rule characterizations, static feature characterizations, etc. associated with the roadway portions.

Module 412 can include a driving characteristics module 418 which can monitor driving characteristics of one or more external vehicles, relative to the vehicle in which ANS 400 is included, navigating in proximity to the vehicle when the vehicle is navigating through one or more roadway portions. Such driving characteristics can include driving velocity, acceleration rate, spacing between roadway boundaries, lane boundaries, other vehicles, physical position, etc. Based on the monitored driving characteristics of the one or more external vehicles in one or more roadway portions, module 418 can develop one or more driving rule characterizations, static feature characterizations, etc. associated with the roadway portions.

Input data module 410 includes an internal sensor module 422 which is configured to receive input data from one or more internal sensors of a vehicle, where the input data can be generated by the one or more internal sensors concurrently with the vehicle in which the ANS 400 is located navigating through one or more roadway portions along one or more driving routes.

Module 422 can include a control element module 426 which monitors one or more instances of input data associated with one or more control elements of vehicle in which the ANS 400 is located as the vehicle navigates through one or more roadway portions. Such input data can include throttle positon data, steering element position, braking device state, wheel turning rate, commands to such elements from one or more user interfaces, some combination thereof, etc. Based on the control element input data, module 426 can develop one or more driving rule characterizations associated with the roadway portions through which the vehicle in which the ANS 400 is located is navigating, one or more static feature characterizations of the roadway portion through which the vehicle in which the ANS 400 is located is navigating, etc.

Module 422 can include a local driving characteristic module 428 which can monitor driving characteristics of vehicle in which the ANS 400 is located as the vehicle is navigating through one or more roadway portions, including driving characteristics of a user of the vehicle as the user is manually navigating the vehicle through the one or more roadway portions. Such driving characteristics can include driving velocity, acceleration rate, spacing between roadway boundaries, lane boundaries, other vehicles, physical position, etc. Based on the monitored driving characteristics of the vehicle in which the ANS 400 is located in one or more roadway portions, module 428 can develop one or more driving rule characterizations, static feature characterizations, etc. associated with the one or more roadway portions.

ANS 400 includes a processing module 430 which is configured to process input data received at module 410 to develop one or more virtual characterizations of one or more roadway portions. In some embodiments, module 430 is configured to process at least some input data and determine a virtual characterization of a roadway portion which includes a characterization of static features included in the roadway portion, a characterization of driving rules for navigating through the roadway portion, some combination thereof, etc.

Module 430 can include a static feature characterization module 432 which is configured to develop a virtual characterization of static features of a particular roadway portion, based on one or more instances of input data associated with the roadway portion received at module 410. Module 430 can include a driving rule characterization module 434 which is configured to develop a virtual characterization of driving rules associated with a particular roadway portion, based on one or more instances of input data associated with the roadway portion received at module 410. Modules 432, 434 are configured to generate virtual characterizations associated with one or more roadway portions based on sensor data generated and received at module 410 when vehicle 401 navigates through the one or more roadway portions. In some embodiments, module 430 is configured to generate one or more virtual roadway portion characterizations of one or more roadway portions, where said characterizations include the various driving rule characterizations and static feature characterizations associated with the roadway portion. In some embodiments, module 430 is configured to generate one or more virtual route characterizations of one or more driving routes, where a generated virtual route characterization includes at least a set of virtual roadway portion characterizations of the various roadway portions included in the route.

In some embodiments, module 430 is configured to update a previously-developed virtual characterization of a roadway portion, based at least in part upon additional sets of input data received at module 410 when vehicle in which the ANS 400 is located subsequently navigating through the roadway portion at least once. In some embodiments, one or more of modules 432, 434 can update one or more portions of a virtual characterization of a roadway portion based at least in part upon determining a difference between one or more static features, driving characteristics, etc. associated with the subsequent navigation through the roadway portion. For example, where an initially-developed virtual characterization of a roadway portion includes a static feature characterization of the roadway portion, and where module 432 determines, based on processing input data generated when vehicle in which the ANS 400 is located subsequently navigates through the same roadway portion again, the presence of an additional static feature, including a road sign, not characterized in the initial static feature characterization, module 432 can update the static feature characterization of the roadway portion to incorporate the additional static feature.

In some embodiments, module 430 is configured to evaluate a virtual characterization of a roadway portion to determine whether to enable autonomous navigation of at least the roadway portion based on the virtual characterization. Such evaluation can include determining a confidence indicator associated with the virtual characterization of a roadway portion, tracking changes in the confidence indicator over successive monitoring of the roadway portion, based on successive navigations of vehicle in which the ANS 400 is located through the roadway portion, comparing the confidence indicator with one or more various thresholds, etc.

Module 430 can include an evaluation module 436 which is configured to evaluate a virtual characterization of a roadway portion, such that the module 436 associates a confidence indicator with the characterization. A confidence indicator can indicate a confidence that the virtual characterization characterizes, within a certain level of accuracy, precision, some combination thereof, or the like of the static features, driving characteristics, etc. associated with the roadway portion, etc. For example, a confidence indicator associated with a virtual characterization of a roadway portion can indicate a confidence that the virtual characterization characterizes, within a certain level of accuracy, all of the roadway static features (e.g., roadway edges, lanes, lane boundaries, road signs, etc.) associated with the roadway portion.

In some embodiments, module 436 updates the confidence indicator of a virtual characterization of a roadway portion over time based on successive processing of successively-generated sets of input data associated with the roadway portion. For example, where the vehicle in which the ANS 400 is located navigates through a given roadway portion multiple times, and successive processing of the successive sets of input data associated with the roadway portion result in fewer or no additional changes to the developed virtual characterization of the roadway portion, module 436 can successively adjust the confidence indicator associated with the virtual characterization to reflect an increased confidence in the accuracy and precision of the virtual characterization. Where a set of input data, upon processing, results in a substantial revision of the virtual characterization of a roadway portion, module 436 can reduce the confidence indicator associated with the virtual characterization.

In some embodiments, evaluation module 436 evaluates one or more portions of a driving route and determines whether to enable autonomous navigation of the vehicle in which the ANS 400 is located through the one or more portions of the driving route, based at least in part upon a determination of whether confidence indicators associated with aa set of roadway portion virtual characterizations, which at least meet a certain contiguous distance threshold, at least meet a certain threshold level. For example, evaluation module 436 can determine, based at least in part upon determining that a continuous set of twelve (12) roadway portions included in a particular driving route have associated confidence indicators which exceed a threshold confidence indication which comprises a particular level of 90%, module 436 can enable an availability of autonomous navigation of at least a portion of the twelve roadway portions. Such an enabling can include establishing one or more "transition" route portions in which a transition between manual and autonomous navigation occurs. Such a transition can include an autonomous transition portion in which a user is instructed to release manual control of one or more control elements of the vehicle in which the ANS 400 is located, a manual transition portion in which a user is alerted to assume manual control of one or more control elements of the vehicle in which the ANS 400 is located, some combination thereof, etc.

Module 430 can include a curation module 438 which is configured to monitor characterizations of one or more roadway portions to determine whether additional processing is needed to enable autonomous navigation of the one or more roadway portions. Such additional processing can include implementing one or more processing operations at one or more computer systems implementing ANS 400. The monitoring at module 438 can include monitoring successive changes in a confidence indicator associated with a virtual characterization over time and determining whether additional processing is needed based on the time-variation of the confidence indicator. For example, module 438 can monitor the rate of change of a confidence indicator associated with a virtual characterization over time.

In some embodiments, module 438 determines that additional processing of the virtual characterization of a roadway portion, input data associated with the roadway portion, some combination thereof, etc. is required, based on a determination that a rate of change of an associated confidence indicator does not meet a threshold rate value. For example, if a confidence indicator associated with a virtual characterization of a particular roadway portion fluctuates over time and does not increase at more than a particular rate, module 438 can determine that additional processing associated with that roadway portion is required. Such additional processing can include evaluating multiple sets of input data generated during multiple separate navigations through the roadway portion, evaluating one or more portions of the virtual characterization which are determined to change repeatedly with successive sets of input data, etc.

In some embodiments, module 438 is configured to determine whether to upload one or more of a virtual characterization of a roadway portion, one or more sets of input data associated with a roadway portion, etc. to one or more remote systems, services, etc. for additional curation, processing, etc. For example, if, after additional processing by a computer system implementing ANS 400, a confidence indicator associated with a virtual characterization does not at least meet a threshold level, module 438 can determine to upload the virtual characterization and various sets of input data associated with the roadway portion to remote service, which can include a cloud service.

Module 400 includes an interface module 450 which is configured to present information associated with autonomous navigation to a user of the vehicle in which the ANS 400 is located via one or more user interfaces of vehicle in which the ANS 400 is located, receive user-initiated commands from the user via one or more user interfaces of the vehicle in which the ANS 400 is located, etc. For example, based on a determination at module 430 to enable autonomous navigation of a portion of a driving route which includes a set of roadway portions, module 450 can present a representation of the driving route, including a representation of the portion of the driving route for which autonomous navigation is enabled, along with an invitation to the user to indicate whether to engage autonomous navigation of the portion of the driving route. Interface module 450 can receive user-initiated commands to engage autonomous driving of one or more portions of a driving route. In some embodiments, the ANS 400 can engage autonomous navigation of a portion of a driving route, for which autonomous navigation is enabled, independently of user interaction with the ANS via one or more user interfaces. For example, upon enabling of autonomous navigation for a roadway portion, the ANS can automatically, without user intervention, engage autonomous navigation upon the vehicle in which the ANS is located encountering the roadway portion. Such automatic engagement of autonomous navigation can be selectively enabled based on user interaction with the ANS via one or more user interfaces included in the vehicle.

Module 400 includes a communication module 460 which is configured to communicatively couple with one or more remote services, systems, etc., via one or more communication networks. For example, module 460 can communicatively couple with a remote service, system, etc. via a wireless communication network, cellular communication network, satellite communication network, etc. module 460 can communicate data with the one or more remote services, systems, etc., including uploading virtual characterizations, input data sets, etc. to a remote service, system, etc., receiving one or more virtual characterizations from the remote service, system, etc., some combination thereof, or the like.

Module 400 including a database module 440 which is configured to store one or more virtual characterizations 442. Such characterizations can include one or more virtual roadway portion characterizations, one or more virtual route portions which includes one or more sets of virtual roadway portion characterizations, some combination thereof, etc. As noted above, virtual characterizations 442 can be developed at module 430 based on one or more sets of input data generated based on monitoring one or more of external data, vehicle data, etc. when the vehicle in which the ANS 400 is located navigates through a particular roadway portion. A virtual route characterization can include a characterization of the various roadway portions included in a route, including an indication of the start and destination locations of the route. For example, where a vehicle routinely navigates along a particular set of roadways portions between two locations, a virtual characterization can be developed for each roadway portion, and a virtual route characterization indicates the various roadway portions included in the route. In some embodiments, the virtual route characterization includes an indication of which roadway portions in the route autonomous navigation is enabled.

As shown, the various virtual characterizations 442 included in database module 440 can include, for each characterization 442, a set of driving rule characterizations 444 characterizing a set of driving rules which can be utilized to autonomously navigate vehicle 401 through one or more roadway portions, and a set of static feature characterizations 446 which characterize the various static features included in one or more roadway portions. In addition, a virtual characterization 442 can include a confidence indicator 448 associated with the characterization 442.

Figure 5A:
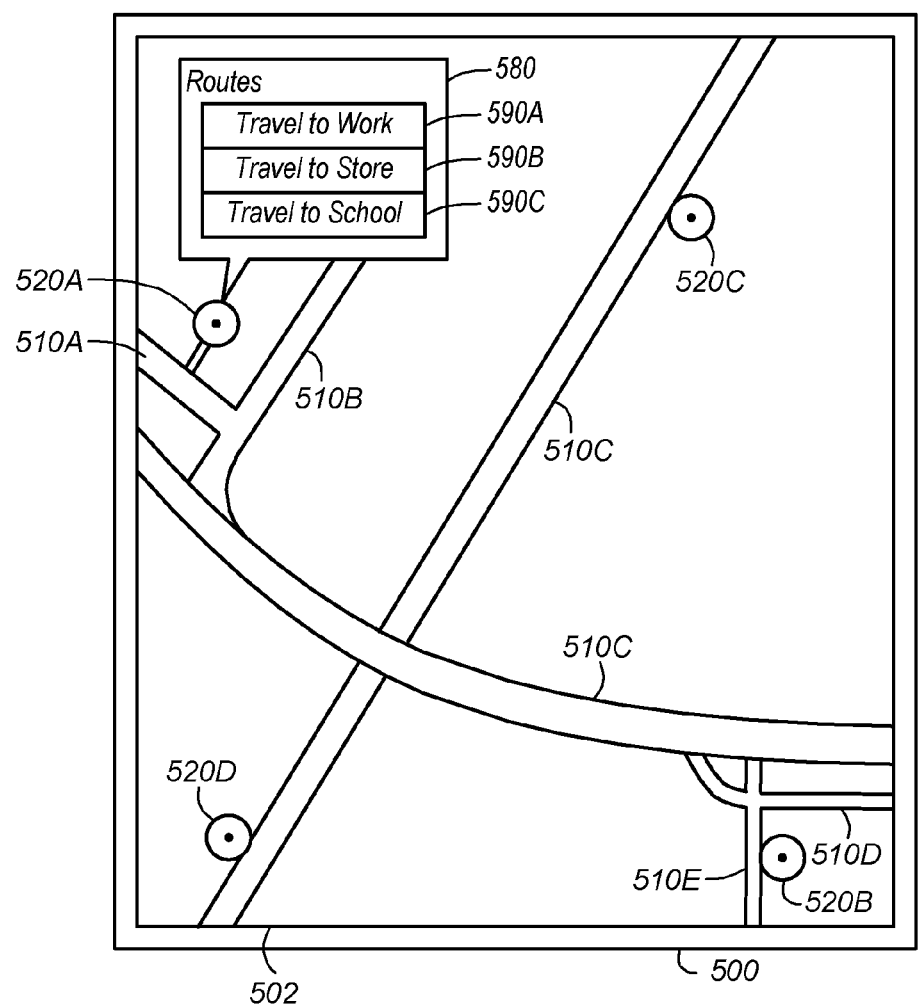
FIG. 5A-C illustrate a user interface associated with the autonomous navigation system, according to some embodiments.
Figure 5B:
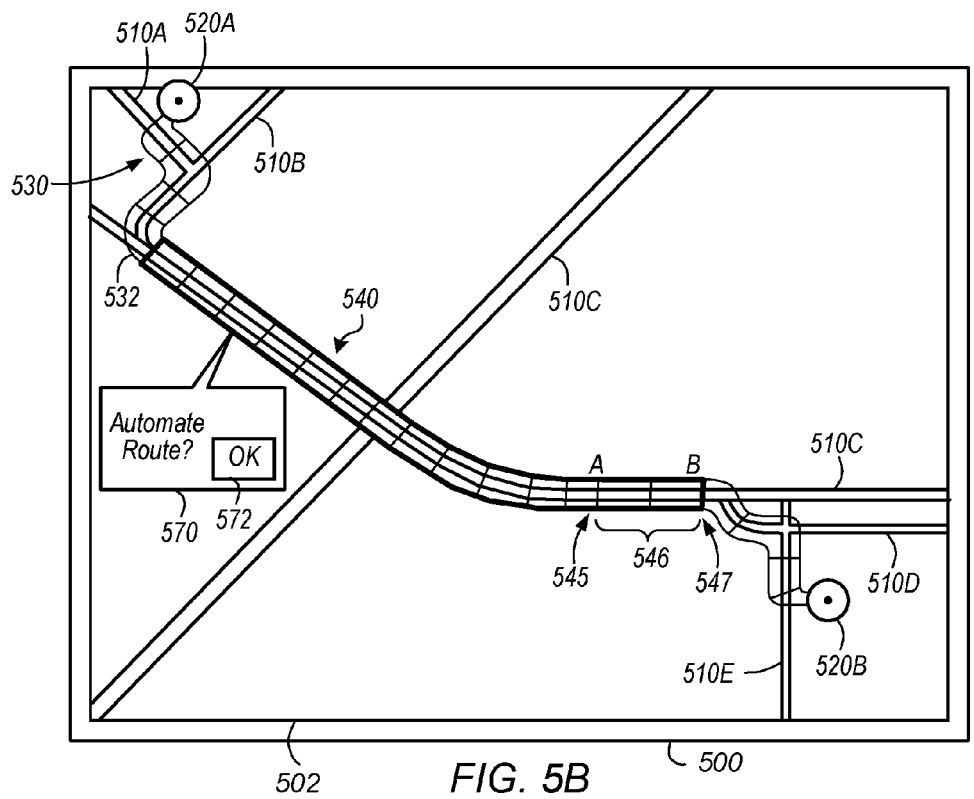
Figure 5C:
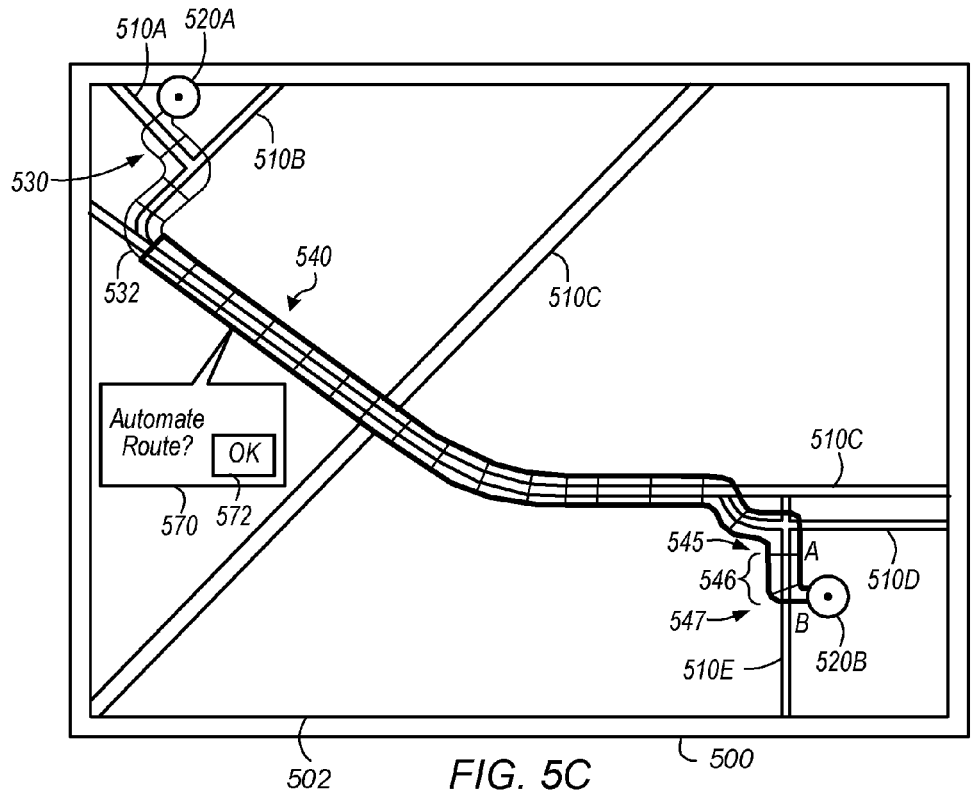

FIG. 5A-C illustrate a user interface associated with the autonomous navigation system, according to some embodiments. The user interface can be generated by any of the embodiments of ANSs.

User interface 500 is a display interface which presents a graphical user interface (GUI) 502 of a display screen. The illustrated GUI 502 illustrates a representation of a map which includes a set of roadways 510A-E in a particular geographic region. The set of roadways 510A-E can be referred to at least a portion of a roadway network.

In some embodiments, a user interface presented to a user of a vehicle in which an ANS is included includes a representation of a route which the vehicle can be navigated between one or more locations. The representation of the route can be presented based on one or more user-initiated commands to the interface which command that a particular re-characterized route be displayed on the represented map of GUI 502. Each route can be associated with a particular title (e.g., "route to work"), and a user can interact with one or more user interfaces to select the particular route based on identifying the particular title associated with the route which a user desires to navigate a vehicle. In some embodiments, a user interface presents a representation of a particular route based at least upon an anticipation that a user of the vehicle will desire to navigate the vehicle along the particular route. Such an anticipation can be based at least in part upon an anticipation that the vehicle is presently located at a physical location which corresponds to a start location of one or more particular routes, at a particular time of day which corresponds to a time range during which a particular route has historically been navigated from the start location, etc.

In some embodiments, the GUI presents an interface element (e.g., one or more icons, message prompts, etc.) which includes one or more interactive elements, each representing a separate route, which a user can interact with to command the interface to present a representation of a particular route. Each route can be a route for which a particular virtual characterization is stored at the ANS and can be associated with a particular route title. The route title can be specified by a user, by the ANS, some combination thereof, etc.

In some embodiments, the GUI presents an interface element which indicates a limited selection of the routes for which the ANS stores virtual characterizations, based at least in part upon one or more of the present location of the vehicle in which the interface and ANS are located, the present time of day at said location, some combination thereof, etc. For example, where a vehicle is presently located proximate to one or more locations which are a starting location for one or more routes for which a virtual characterization is stored in the ANS, the interface can present an interactive element, including one or more presentations of the one or more routes and prompt a user to interact with one or more of the representations to select one or more of the routes. Upon receiving an indication of a user interaction with one or more particular representations, the interface can interact with the ANS to present a graphical representation of the one or more routes associated with the one or more particular representations.

In FIG. 5A, multiple roadways 510A-E are presented on GUI 502, which also presents a plurality of location icons 520A-D associated with various locations. In the illustrated embodiment, the vehicle in which the interface 500 is located can be presently proximate to location 520A, which can be a starting location for several separate routes to separate destination locations. As also shown, three locations 520B-D are presented on the GUI at locations, relative to the illustrated roadways 510, which correspond to the physical location of said locations relative to said roadways. Each separate location can be a destination location for one or more driving routes which originate at starting location 520A.

In some embodiments, the separate locations 520B-D can be presented in GUI in response to identifying that the vehicle in which the interface 500 is located is proximate to location 520A, identifying multiple separate driving routes for which location 520A is a starting location, and identifying locations 520B-D as destination locations of one or more of said identified separate driving routes. For example, in response to detecting that a user has occupied the vehicle, the ANS and interface can be interoperable to identify, based on input data received at the ANS from one or more sensor devices, a present location of the vehicle. The ANS can identify one or more starting locations, of one or more driving routes for which virtual characterizations are stored at the ANS, which are proximate to the present location of the vehicle, and further identify one or more destination locations of the one or more driving routes. The interface can present, to the user, graphical representations of the identified starting locations and destination locations, and can further present one or more interactive interface elements with which the user can interact to select one or more of the driving routes. As shown, GUI 502 includes an interface element 580 which includes three separate representations 590A-C of three separate driving routes. Each driving route can have starting location 520A and a separate one of the illustrated destination locations 520B-D. As shown, each representation 590A-C includes a route title associated with the respective driving route. Each representation can be interactive, such that a user can interact with one or more of the representations 590 to select one or more of the driving routes associated with the representations. In response to a user-initiated interaction with one or more particular representations 590A-C, one or more of the ANS and interface can identify that a user has selected a particular driving route and present a representation of same on the GUI.

FIG. 5B illustrates GUI 502 presenting a representation of a particular driving route 530 which extends between a start location 520A and a destination location 520B. The driving route 530 includes a set of roadway portions 532 extending between the two locations 520A-B. In some embodiments, the represented route 530 does not indicate the boundaries between the various roadway portions 532 included in the route 530.

In some embodiments, a particular represented driving route includes one or more portions for which autonomous navigation is enabled. In the illustrated embodiment, the representation 530 of a driving route includes a representation of a portion 540 of the route for which autonomous navigation is enabled. The representation can include a message 570 which invites a user to indicate, via interaction with one or more interactive elements 572 of the GUI 502, whether to engage autonomous navigation of the portion 540 of the route for which autonomous navigation is enabled.

In some embodiments, where a portion 540 of a route 530 has autonomous navigation thereof enabled, a portion of said portion 540 is associated with a transition between manual navigation and autonomous navigation. For example, transition region 546 of portion 540 is associated with transitioning from autonomous navigation of portion 540 to manual navigation of a remainder of route 530 to location 520B. In some embodiments, the GUI is configured to present various messages to a user based on a present location of the vehicle in which the interface device 500 is included. For example, where the vehicle is being autonomously navigated through portion 540 and crosses boundary 545 into the transition portion, GUI 502 can present an alert message alerting the user to imminent transfer to manual navigation. Where the vehicle crosses boundary 547, autonomous navigation can be disabled, and a message alerting the user to this fact can be presented on GUI 502. One or more alerts presented on user interface 502 can be accompanied by other alert signals presented via one or more other user interfaces. For example, a presentation of an alert message on GUI 502 can be accompanied by an audio signal presented via one or more speaker interface devices of the vehicle.

In some embodiments, portion 540 is represented distinctly from a remainder of route 530. For example, portion 540 can be represented in a different color relative to a remainder of route 530. In another example, an animation effect can be presented on portion 540.

FIG. 5C illustrates a user interface associated with the autonomous navigation system, according to some embodiments. The user interface can be generated by any embodiments of ANSs. In some embodiments, where the portions of a route for which autonomous navigation is enabled changes over time, the representation of the portion 540 of the route for which autonomous navigation is enabled can change accordingly. For example, as shown, where the roadway portions in route for which autonomous navigation is enabled include additional portions extending toward location 520B, relative to the portions as shown in FIG. 5B, the representation of portion 540 can be shown in GUI 502 to be extended accordingly. Where the portion 540 is recently extended, within a certain period of time, the extended element of portion 540 can be represented distinctly from the remainder of portion 540, including being represented in a different color from the remainder of portion 540.

Figure 6:
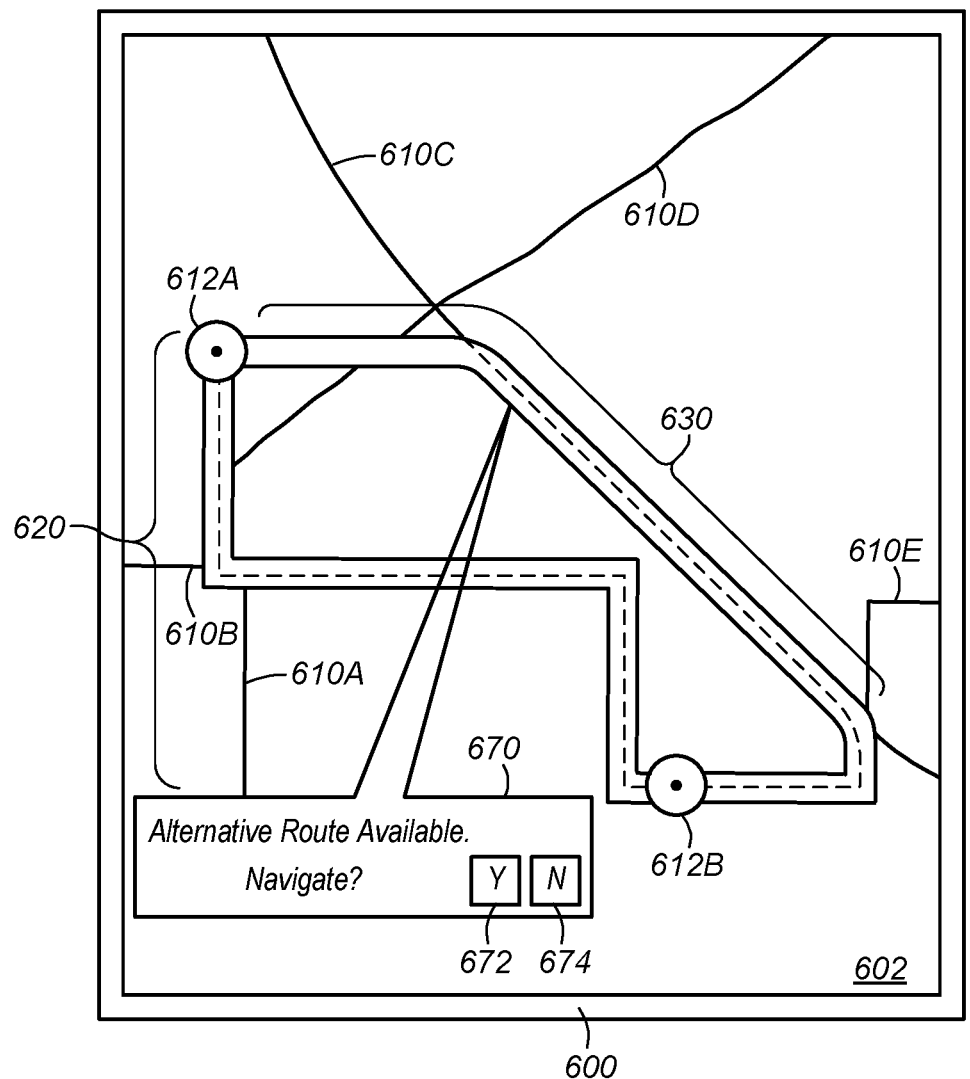
FIG. 6 illustrates a user interface associated with the autonomous navigation system, according to some embodiments.

FIG. 6 illustrates a user interface associated with the autonomous navigation system, according to some embodiments. The user interface can be generated by any embodiments of ANSs.

In some embodiments, where one or more alternative routes between one or more particular locations, relative to a route most recently navigated between the one or more particular locations, are available, an indication of such one or more alternative routes can be presented to a user via a user interface and the user can be requested to engage in navigation of the one or more alternative routes, relative to the most recently-navigated route.

An alternative route can be proposed to a user based upon a determination that a confidence indicator associated with a virtual characterization of one or more roadway portions included in a driving route is not sufficiently high to enable autonomous navigation of one or more portions of the route. The alternative route can include a route for which autonomous navigation is enabled for one or more portions thereof, such that a proposal to a user to engage in navigation of the alternative route includes an invitation to engage in autonomous navigation of the one or more portions of the alternative route. In some embodiments, the alternative route does not include portions for which autonomous navigation is enabled and virtual characterizations of one or more portions of the alternative route may be presently non-existent. As a result, a proposal to navigate the alternative route can include an invitation to a user to manually navigate along the route, so that a virtual characterization of one or more roadway portions included in the alternative route can be developed and autonomous navigation of the alternative route cane be subsequently enabled.

In the illustrated embodiment, user interface device 600 includes a display interface 602, which can include a GUI 602. GUI 602 illustrates one or more representations of one or more roadways 610A-E and a representation of a particular driving route 620 between a starting location 612A and a destination location 612B. As further shown, GUI 602 illustrates a representation of an alternative route 630 between the two locations 612A-B and an message 670 prompting a user to selectively engage or decline engaging autonomous navigation of the alternative route 630, rather than navigate along route 620, based at least in part upon interaction with one or more interactive elements 672-674 of the GUI 602.

Figure 7:
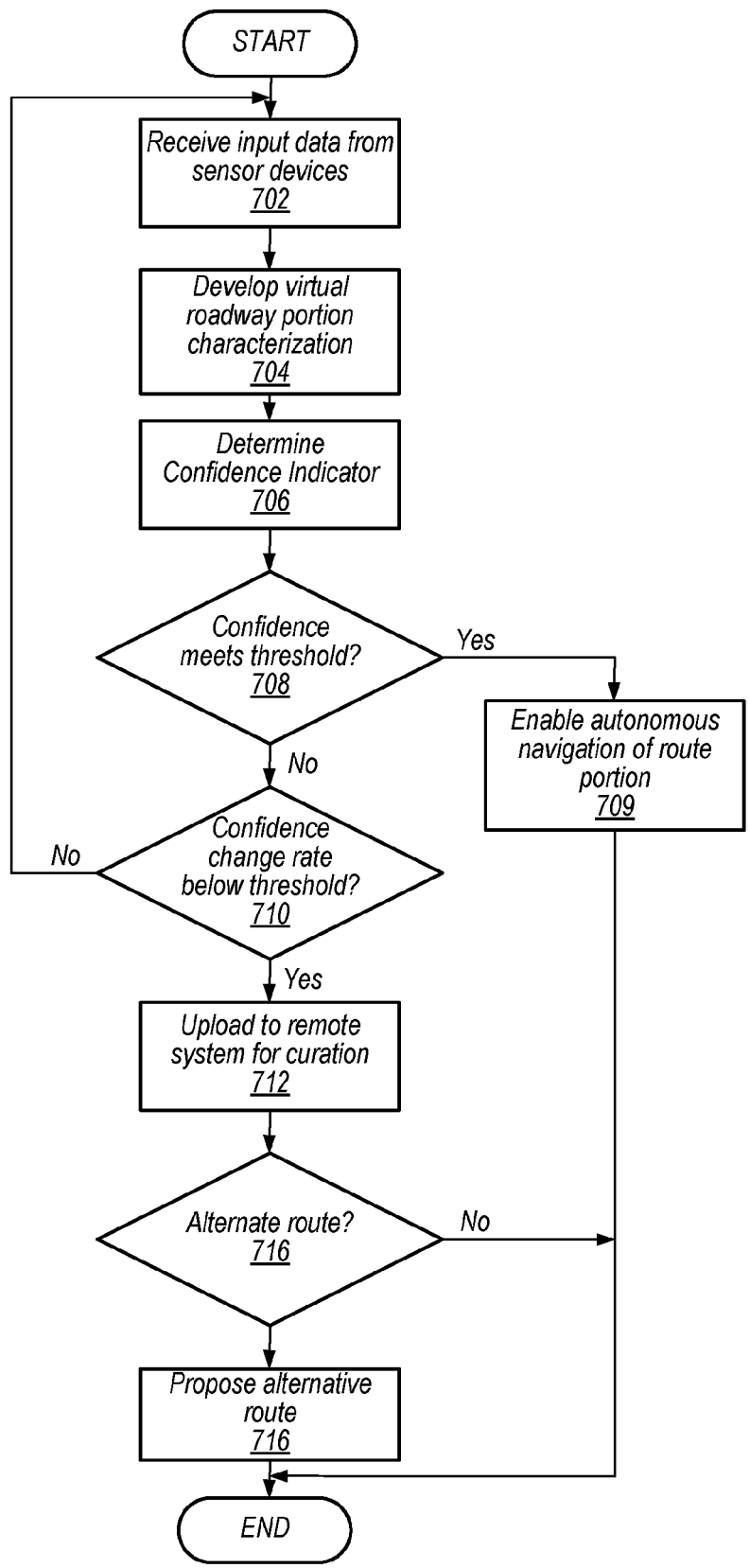
FIG. 7 illustrates developing virtual characterizations of one or more roadway portions to enable autonomous navigation of the one or more roadway portions, according to some embodiments.

FIG. 7 illustrates developing virtual characterizations of one or more roadway portions to enable autonomous navigation of the one or more roadway portions, according to some embodiments. The developing can be implemented by any of the embodiments of ANSs included in one or more vehicles and can be implemented by one or more computer systems.

At 702, a set of input data is received from one or more sensor devices of a vehicle based on the vehicle being manually navigated through one or more roadway portions is received. The set of input data can include external sensor data indicating various static features of the roadway portion, vehicle sensor data indicating various instances of data associated with the vehicle, driving characteristic data associated with one or more of the vehicle, one or more other external vehicles navigating the roadway portion in proximity to the vehicle, some combination thereof, or the like.

At 704, based at least in part upon processing at least some of the received set of input data, a virtual characterization of the one or more roadway portions is developed. The virtual characterization can include a characterization of a set of driving rules associated with navigating through the roadway portion, a characterization of the static features of the roadway portion, some combination thereof, etc. In some embodiments, developing a virtual characterization of one or more roadway portions includes developing a virtual characterization of a driving route which includes one or more sets of roadway portions through which the vehicle navigates between one or more start locations, destination locations, etc.

At 706, a confidence indicator associated with the developed virtual characterizations of the one or more roadway portions is determined. The confidence indicator can indicate a confidence associated with one or more of the accuracy, precision, etc. of the virtual characterization of one or more roadway portions. At 708, a determination is made regarding whether the confidence indicator associated with one or more virtual characterizations at least meets a confidence threshold level. The threshold level can be associated with a sufficiently-high confidence indicator that autonomous navigation through the one or more roadway portions can be safely engaged using the virtual characterization of the one or more roadway portions. If so, at 709, autonomous navigation of the one or more roadway portions is enabled, such that autonomous navigation of the one or more roadway portions can be engaged. If not, at 710, a determination is made regarding whether a rate of change of the confidence indicator of the one or more virtual characterizations, based on successive changes in the virtual characterizations based on successive sets of input data generated based on successive manual navigations of the one or more roadway portions, is more than a threshold rate level. If so, the process 702-710 repeats iteratively with successive manual navigations along the one or more roadway portions resulting in generation of successive sets of input data used to update the virtual characterizations and confidence indicators of the one or more roadway portions, until either the confidence indicator increases above the confidence threshold, changes at a rate which is less than the confidence rate threshold, etc.

If, as shown at 712, the rate at which the confidence indicator of one or more virtual characterizations of one or more roadway portions changes is determined at 710 to be less than a confidence rate threshold, one or more of the virtual characterizations, sets of input data, etc. can be uploaded to a remote service, system, etc. for additional processing to modify the virtual characterizations to increase the confidence indicator associated with the virtual characterizations beyond the confidence threshold. At 714, a determination is made regarding whether an alternative route, relative to the driving route in which the one or more roadway portions are included, is available. The alternative route, in some embodiments, includes one or more portions for which autonomous navigation is enabled. At 716, if an alternative route is available, the alternative route can, via one or more user interfaces of the vehicle, be proposed to a user of a vehicle as an option for navigation between a starting location and a destination location in the alternative to the driving route most recently navigated between the starting location and the destination location.

Autonomous Navigation Network

In some embodiments, multiple ANSs are installed in multiple separate vehicles, and each separate ANS can develop virtual characterizations of the one or more driving routes navigated by the respective vehicle in which the respective ANS is installed. In some embodiments, the multiple separate ANSs can communicatively couple with a remote system, service, etc. and communicate data therewith. A remote system, service, etc. can include a navigation monitoring system, implemented on one or more computer systems which are external to the multiple vehicles and communicatively coupled to one or more vehicles via one or more communication networks. One or more monitoring systems can be communicatively coupled via one or more communication networks, and an ANS in a given vehicle can communicatively couple with one or more of the navigation monitoring systems.

Data communication between the multiple ANSs and one or more monitoring systems can include various ANSs "uploading" one or more sets of virtual route characterizations, virtual roadway portion characterizations, input data received from sensors of the vehicle in which the uploading ANS is located, etc. In some embodiments, an ANS uploads a virtual characterization to a remote system, service, etc. which is incorporated, at the navigation monitoring system, into a database of characterizations and input data. In some embodiments, an ANS uploads one or more virtual characterizations, sets of input data, etc. to be processed by the navigation monitoring system to refine one or more virtual characterizations, so that automated driving can be enabled for the one or more characterizations.

Data communication between the multiple ANSs and one or more monitoring systems can include the navigation monitoring system distributing, or "downloading", one or more virtual characterizations of one or more driving routes, roadway portions, etc. to one or more ANSs installed in one or more vehicles. A virtual characterization distributed to an ANS from the navigation monitoring system can include a virtual characterization developed at least partially at the navigation monitoring system based on data received from one or more ANSs, a virtual characterization which was developed at a separate ANS and uploaded to the navigation monitoring system, some combination thereof, etc.

Figure 8:
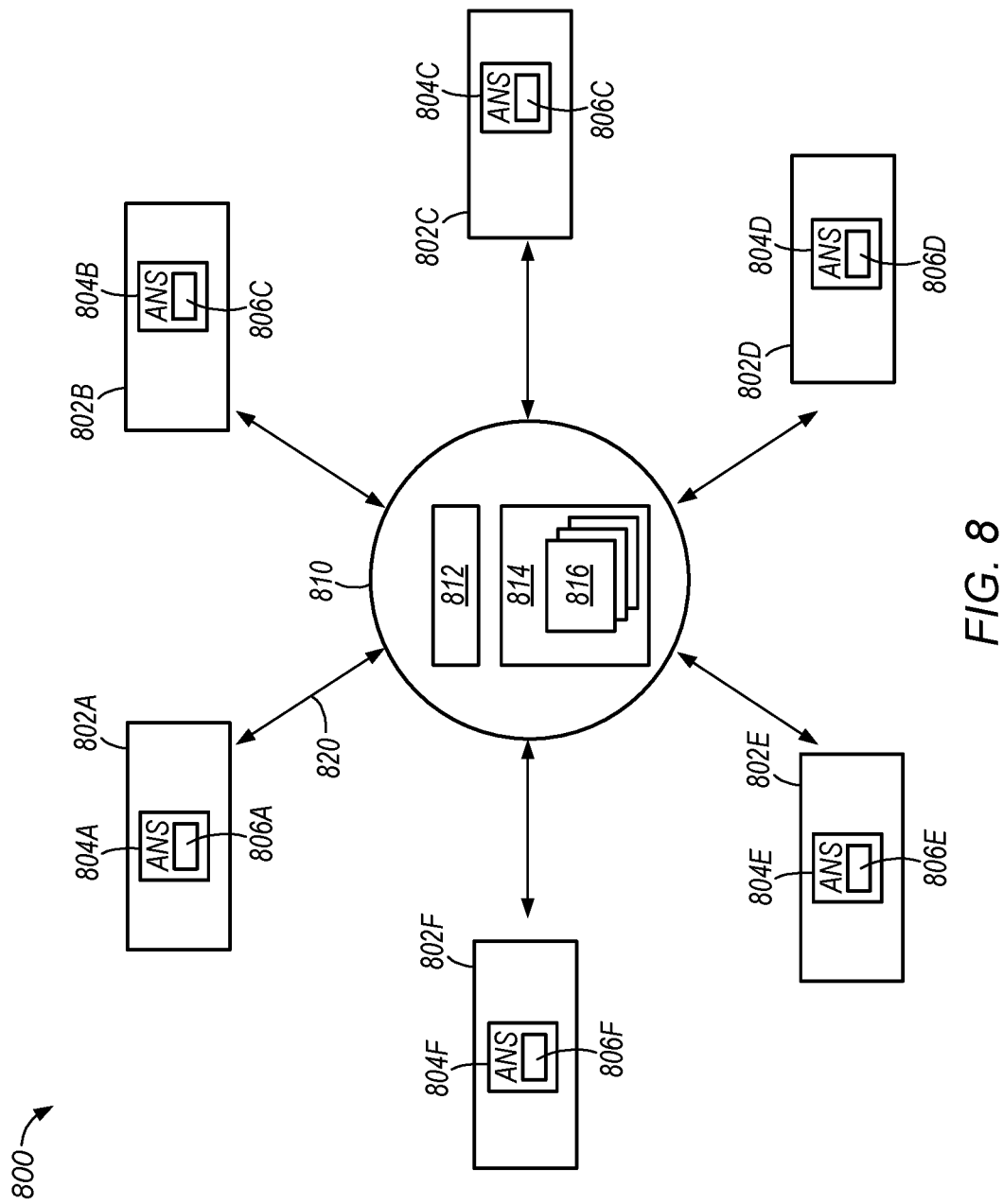
FIG. 8 illustrates a schematic of an autonomous navigation network, according to some embodiments.

FIG. 8 illustrates a schematic of an autonomous navigation network 800 which comprises multiple ANSs 804A-F, located in separate vehicles 802A-F, which are communicatively coupled to a navigation monitoring system 810 via one or more communication links 820 over one or more communication networks, according to some embodiments. Each ANS 804 illustrated can include any of the ANSs illustrated in any of the above embodiments.

In some embodiments, a navigation monitoring system 810, implemented on one or more computer systems which are external to the various vehicles 802 in network 800, includes a processing module 812, implemented by one or more instances of processing circuitry included in the navigation monitoring system, which can process one or more sets of input data associated with one or more roadway portions, one or more virtual characterizations of one or more roadway portions, one or more virtual characterizations of one or more driving routes, some combination thereof, etc. In some embodiments, a navigation monitoring system 810 includes a database 814 in which multiple various virtual characterizations 816 of one or more driving routes, roadway portions, etc. are stored.

In some embodiments, the navigation monitoring system 810 communicates with the various ANSs 804A-F via the one or more communication links 820. Such communication can include exchanging virtual characterizations, exchanging sets of input data associated with one or more roadway portions, etc. between one or more ANSs 804 and the navigation monitoring system 810. For example, each ANS 804A-F includes at least one database 806A-F in which one or more sets of input data, virtual characterizations, etc. can be stored. An ANS 804 can upload a virtual characterization, developed by the ANS 804 and stored at the respective database 806, to monitoring system 810 for one or more of processing, storage at database 814, etc. Monitoring system 810 can distribute one or more virtual characterizations 816 stored at database 814, including virtual characterizations received from one or more ANSs 804, virtual characterizations at least partially developed at the navigation monitoring system 810 via processing module 812, etc. to one or more ANSs 804 to be stored in one or more databases 806 of the respective one or more ANSs 804. For example, a virtual route characterization developed at ANS 804E can be uploaded to system 810 and distributed to ANS 804A-D, F. In some embodiments, data including some or all of a route characterization can be uploaded continuously from one or more ANSs to system 810. For example, concurrently with vehicle 802A navigating a route autonomously, ANS 804A can process input data from various sensor devices of vehicle 802A and continuously upload input data, virtual characterizations based at least in part upon such input data, some combination thereof, etc. to system 810 as vehicle 802A continues to navigate one or more roadway portions.

Figure 9A:
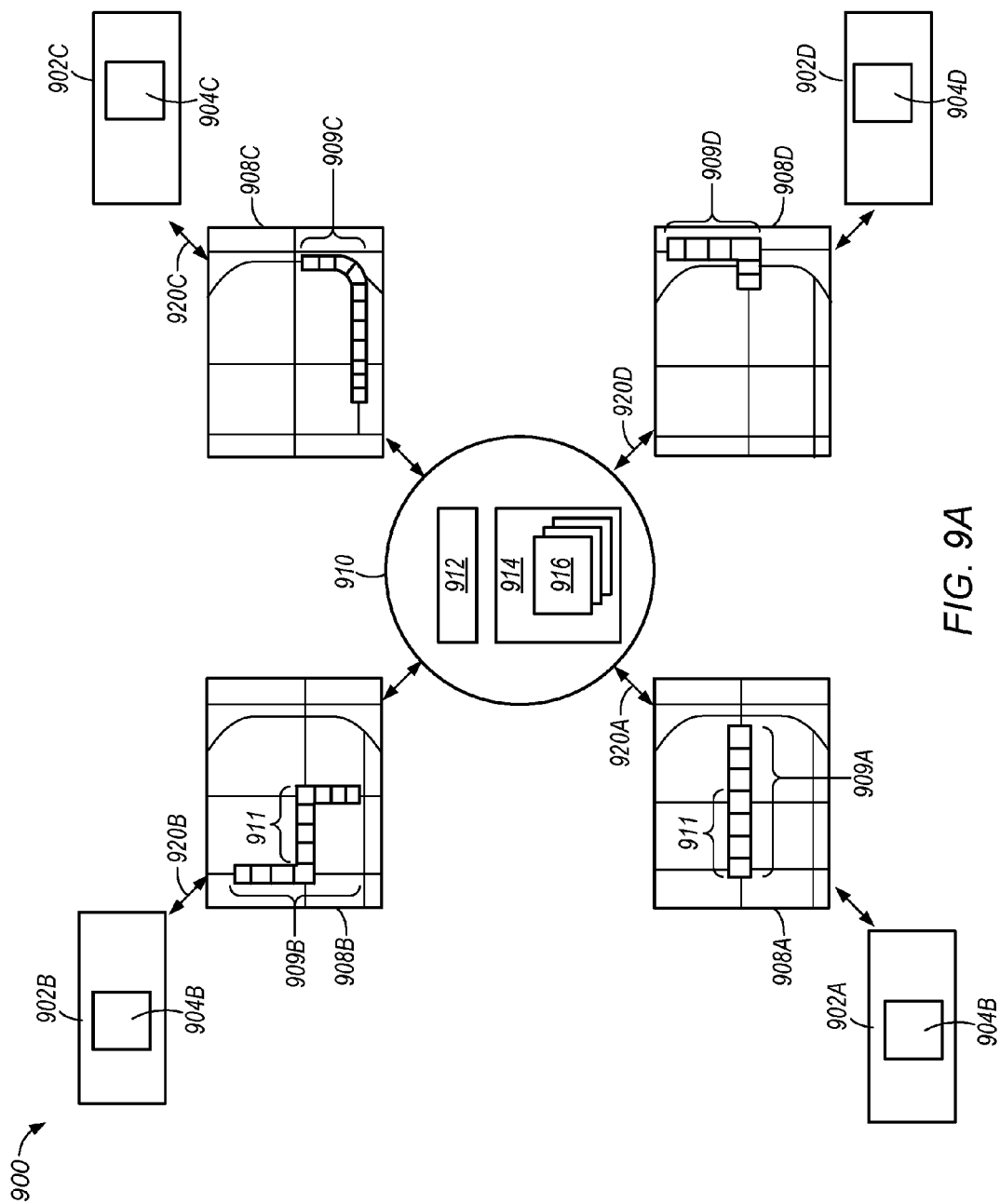
FIG. 9A-B illustrate a schematic of an autonomous navigation network, according to some embodiments.
Figure 9B:
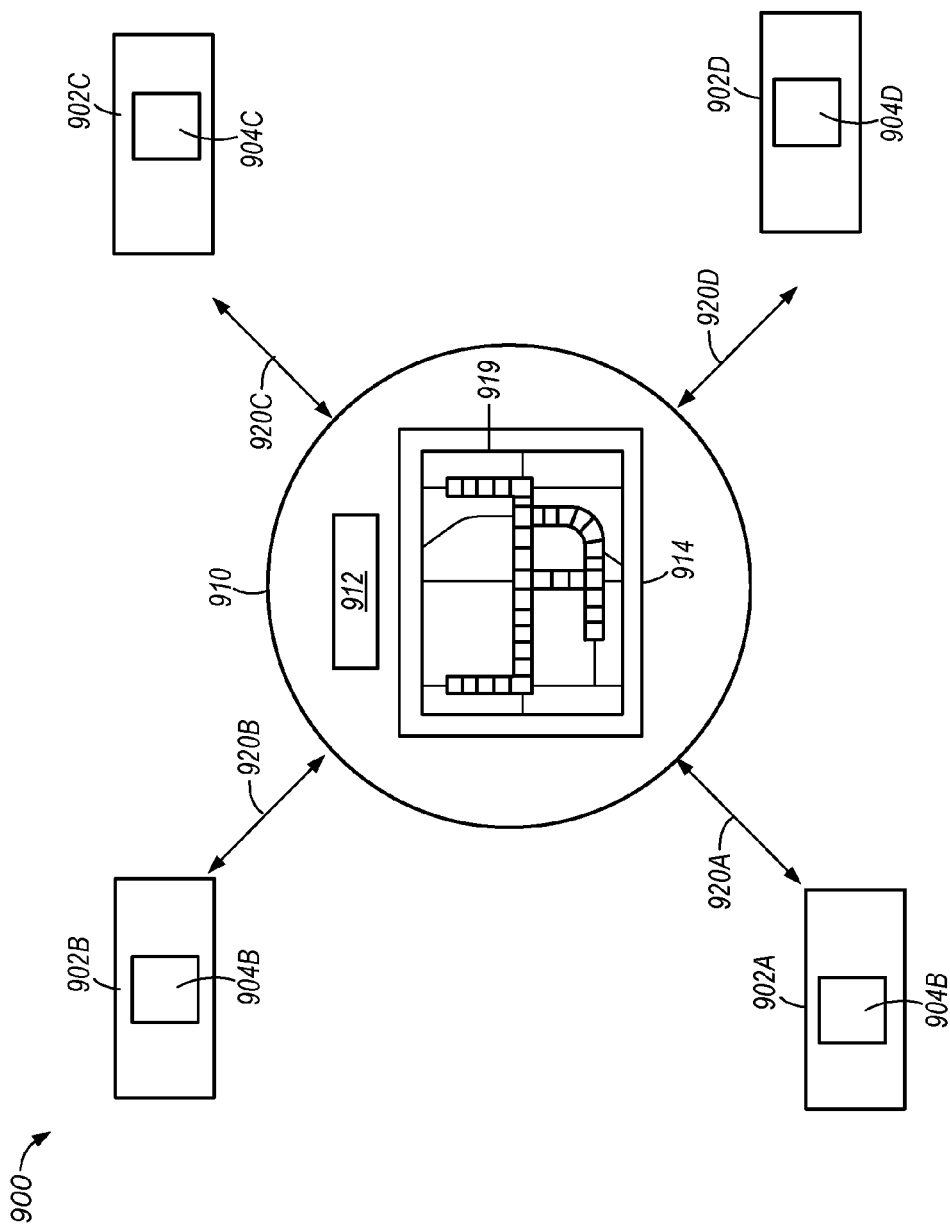

FIG. 9A-B illustrate a schematic of an autonomous navigation network 900 which comprises multiple ANSs 904A-D, located in separate vehicles 902A-D, which are communicatively coupled to a navigation monitoring system 910 via one or more communication links 920A-D over one or more communication networks, according to some embodiments. Each ANS 904 illustrated can include any of the ANSs illustrated in any of the above embodiments.

In some embodiments, multiple separate ANSs located in separate vehicles develop virtual characterizations of various separate sets of roadway portions, driving routes, etc. The separate ANSs can communicate one or more of such locally-developed virtual characterizations to the navigation monitoring system, where the various characterizations from various ANSs can be incorporated into a collection of virtual characterizations at the navigation monitoring system. In some embodiments, one or more ANSs located in one or more separate vehicles autonomously navigating one or more roadway portions concurrently and continuously uploads virtual characterizations developed based on sensor data generated during the autonomous navigation of the one or more roadway portions.

FIG. 9A illustrates each of the separate ANSs 904A-D of the separate vehicles 902A-D communicating a separate set 909A-D of virtual roadway portion characterizations to monitoring system 910 via separate communication links 920A-D. each separate set 909A-D of virtual characterizations is illustrated in FIG. 9A in separate map representations 908A-D showing the geographic locations and roadways for which the separate sets 909A-D include virtual characterizations. As shown, each map 908A-D is an illustrated representation of a common geographic region, and each separate set 909A-D of virtual characterizations includes a set of multiple virtual roadway portion characterizations of a separate set of roadway portions. In some embodiments, separate sets of virtual characterizations include virtual characterizations of common roadway portions. For example, as shown in FIG. 9A, the sets of virtual characterizations 909A-B include virtual characterizations of roadway portions 911.

The various ANSs can communicate the virtual characterizations to the navigation monitoring system based on various triggers. For example, the various ANSs 904 can communicate at least some of the locally-developed virtual characterizations, locally-stored virtual characterizations, etc. to the navigation monitoring system 910 in response to development, updating, etc. of said characterizations, in response to a timestamp trigger, in response to a query from the navigation monitoring system 910, intermittently, continuously, periodically, some combination thereof, etc.

Upon receipt of a virtual characterization from an ANS, the navigation monitoring system can implement processing of the virtual characterization, which can include automatically modifying various elements of the virtual characterization such that the confidence indicator associated with the virtual characterization is improved. The processing, which can be implemented by one or more processing modules 912 of the system 910, can include processing a virtual characterization in response to determining that a confidence indicator associated with the receive virtual characterization is less than a threshold confidence indication, processing the virtual characterization in response to identifying a curation flag associated with the received virtual characterization, etc.

In some embodiments, the navigation monitoring system 910 processes received virtual characterizations, input data sets, etc. associated with one or more roadway portions with respect to stored virtual characterizations of the one or reo roadway portions. Such processing can include comparing two separate virtual characterizations of a roadway portion and discarding a virtual characterization in favor of storing another virtual characterization in response to a determination that the confidence indicator associated with the favored virtual characterization is superior to that of the discarded virtual characterization. In some embodiments, such processing can include developing a "composite" virtual characterization of one or more roadway portions based at least in part upon data incorporated from two or more virtual characterizations of the one or more roadway portions. For example, a composite virtual characterization of a roadway portion can be developed based on at least some static feature characterizations included in one virtual characterization of the roadway portion, at least some other static feature characterizations included in another virtual characterization of the roadway portion, and at least some driving rule characterizations incorporated from yet another virtual characterization of the roadway portion. Such incorporation of various elements from various virtual characterizations can be based at least in part upon a determination that a confidence indicator associated a given element of a given virtual characterization is superior to corresponding elements of other virtual characterizations.

FIG. 9B illustrates a graphical representation of a set 919 of virtual roadway portion characterizations stored in the database 914 of monitoring system 910, where the various characterizations in the set 919 can be developed based at least in part upon characterizations 909A-D received from one or more of the ANSs 904. As shown, the set 919 of virtual characterizations is shown in a map representation 918 showing the geographic locations and roadways for which the set 919 includes virtual characterizations. Set 919 includes a virtual characterization for each of the roadway portions for which a virtual characterization was received in one or more of the sets 909 received from one or more of the ANSs 904. Where multiple virtual characterizations of a roadway portion are received in the various sets 909, the corresponding virtual characterization in set 919 can include a composite characterization developed from the multiple received characterizations, a selected one of the received virtual characterizations, some combination thereof, etc.

In some embodiments, a navigation monitoring system distributes at least a portion of the virtual characterizations stored at the navigation monitoring system to one or more ANSs via one or more communication links. The navigation monitoring system can distribute one or more virtual characterizations to an ANS in response to receiving a request from the ANS for such distribution, in response to an update to the virtual characterizations stored at the navigation monitoring system, in response to a timestamp trigger, intermittently, continuously, at periodic intervals, some combination thereof, or the like. As shown in FIG. 9B, monitoring system 910 can distribute one or more of the virtual characterizations included in the stored set 919 of virtual characterizations to one or more of the ANSs 904A-D via one or more of the communication links 920A-D. In some embodiments, a navigation monitoring system distributes, to a given ANS, a limited selection of virtual characterizations of one or more roadway portions for which the given ANS does not presently have a stored virtual characterization associated with a greater confidence indicator than the confidence indicator associated with the virtual characterizations in the limited selection.

In some embodiments, an ANS can communicate with a navigation monitoring system to develop virtual characterizations of one or more roadway portions with sufficiently high confidence indicator to enable autonomous navigation of the one or more roadway portions via the virtual characterizations. Such communication can include uploading one or more sets of input data associated with the roadway portions for development into one or more virtual characterizations, uploading one or more developed virtual characterizations for additional processing, etc.

In some embodiments, an ANS can upload a virtual characterization, one or more sets of input data, some combination thereof, or the like to a navigation monitoring system, based at least in part upon a determination that the confidence indicator associated with one or more virtual characterizations is changing at less than a threshold rate over a certain number of updates of the one or more virtual characterizations. Such uploading can include communicating a request to the navigation monitoring system to implement additional processing of the virtual characterization, input data, etc. to generate a modified virtual characterization. Once a virtual characterization is received at the navigation monitoring system, a processing module of the navigation monitoring system can implement processing of one or more characterizations included in the virtual characterization to generate a modified virtual characterization with an improved associated confidence indicator. Such processing can include implementing processing capabilities not available at the ANS. If such a modified virtual characterization cannot be generated based on the processing at the navigation monitoring system, the navigation monitoring system can flag one or more portions of the virtual characterization for "manual curation", whereby the one or more portions of the virtual characterization can be modified based on user-initiated modification of said portions.

A user, operator, etc. can be alerted by the navigation monitoring system that the virtual characterization requires manual modification to improve the associated confidence indicator thereof. If the manual curation does not result in a modified virtual characterization having an associated confidence indicator which at least meets a threshold level, the navigation monitoring system can generate a dispatching command to dispatch a dedicated sensor suite, which can be included in a dedicated sensor vehicle, to the one or more roadway portions characterized in the virtual characterization, where the sensor suite is commanded to collect additional sets of input data associated with the roadway portions. Once such additional sets of input data are received at the navigation monitoring system from the dedicated sensor suit, the data can be processed to implement additional modification of the virtual characterization of the roadway portion.

If such additional processing does not result in a modified virtual characterization having an associated confidence indicator which at least meets a threshold level, the roadway portion can be associated with a warning flag, and alternative driving routes can be associated with driving routes which include the flagged roadway portion. Characterizations of such alternative driving routes can be distributed to one or more ANSs, including the ANS from which the virtual characterization was originally received.

Figure 10:
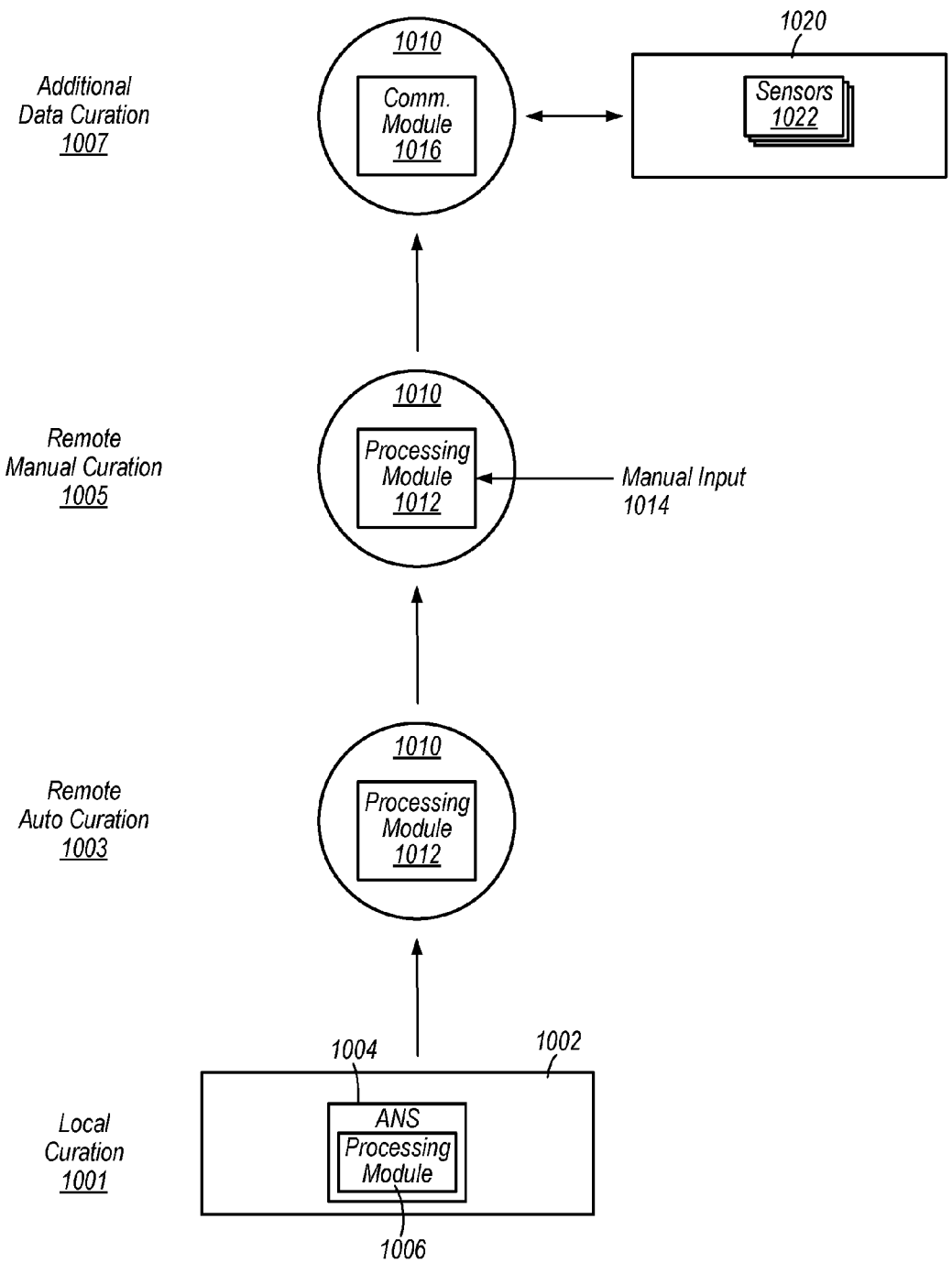
FIG. 10 illustrates a "curation spectrum" of processing available to generate one or more virtual roadway portion characterizations, according to some embodiments.

FIG. 10 illustrates a "curation spectrum" 1000 of processing available to generate one or more virtual roadway portion characterizations, according to some embodiments. Such a curation spectrum 1000 can include one or more ANSs, monitoring systems, etc., which can include any of the above embodiments of ANSs, monitoring systems, etc.

In some embodiments, an ANS included in a vehicle implements "local curation" 1001 of a virtual characterization of a roadway portion, where the ANS processes one or more sets of input data associated with the roadway portion, and a virtual characterization of the roadway portion, to update the virtual characterization. Such processing can occur in response to receiving the set of input data and can occur multiple times in response to successively-generated sets of input data, based on successive navigations of a vehicle along the roadway portion. Such successive processing can result in changes to a confidence indicator associated with the virtual characterization over time. For example, with each update to a virtual characterization, the confidence indicator can change based at least in part upon the changes, if any, to the virtual characterization with each successive update thereof.

As shown in FIG. 10, a vehicle 1002 can include an ANS 1004 which includes a processing module 1006 which can implement said updating. The processing module 1006 can compare the virtual characterization and associated confidence indicator with one or more threshold confidence indicators, threshold rates, etc. The ANS 1004 can selectively enable autonomous navigation of the roadway portion based at least in part upon a determination that the associated confidence indicator at least meets a confidence indication threshold, which is also referred to herein interchangeably as a "threshold confidence indication", "threshold", etc.

Where the confidence indicator does not meet the threshold, the ANS 1004 can determine whether the confidence indicator is changing at a minimum threshold rate over time with successive updates to the associated virtual characterization. If not, the ANS 1004 can upload some or all of the virtual characterization to a navigation monitoring system 1010 to implement the next level of "curation". Such curation can include "remote automatic curation" 1003, where one or more processing modules 1012 included in the navigation monitoring system 1010 process one or more virtual characterizations of one or more roadway portions to develop one or more modified virtual characterizations. Such processing can be implemented automatically, without manual input from one or more users, utilizing processing capabilities not available locally to the ANS 1004. For example, the processing module 1012 of the navigation monitoring system 1010 can include processing systems, processing circuity, etc. configured to implement additional processing algorithms, modification processes, etc. which can modify a received virtual characterization. The automatic curation 1003 is implemented to generate a modified virtual characterization of the roadway portion with an associated confidence indicator which is superior to the confidence indicator associated with the virtual characterization of the roadway portion received from the ANS 1004. The automatic curation 1003 can, in some embodiments, result in a modified virtual characterization of a roadway portion associated with a confidence indicator which at least meets a threshold confidence indication associated with enabling autonomous navigation of the roadway portion. Where the automatic curation 1003 results in such a modified virtual characterization, the modified virtual characterization can be stored at the navigation monitoring system 1010, distributed to the ANS 1004, etc.

Where the automatic curation 1003 results in a modified virtual characterization associated with a confidence indicator which does not at least meet a threshold value, the navigation monitoring system 1010 is configured to implement the next level of "curation", which can include "manual curation" 1005, where the processing module 1012 of the navigation monitoring system 1010 implements additional processing of a virtual curation based on user-initiated manual input. Such implementation of manual curation can include the processing module 1012 responding to a determination that the confidence indicator of a modified virtual characterization of a roadway portion, developed via automatic curation 1003, does not at least meet a threshold. The threshold can be a confidence indication threshold associated with enabling autonomous navigation, a confidence indication of a virtual characterization originally received at the navigation monitoring system 1010 from ANS 1004, some combination thereof, etc.

Responding to such a determination can include generating a warning message, which can be transmitted to one or more human operators supported by one or more computer systems, identifying the virtual characterization and requesting "manual curation" of one or more portions of the identified virtual characterization. In response, the navigation monitoring system can receive one or more operator-initiated manual input commands to implement particular modifications to one or more elements of the virtual characterization. The navigation monitoring system can modify the virtual characterization, based on the received one or more operator initiated manual input commands, to generate a modified virtual characterization of the roadway portion with an associated confidence indicator which is superior to the confidence indicator associated with the virtual characterization of the roadway portion received from the ANS 1004. The manual curation 1005 can, in some embodiments, result in a modified virtual characterization of a roadway portion associated with a confidence indicator which at least meets a threshold confidence indication associated with enabling autonomous navigation of the roadway portion. Where the manual curation 1005 results in such a modified virtual characterization, the modified virtual characterization can be stored at the navigation monitoring system 1010, distributed to the ANS 1004, etc.

Where the manual curation 1005 results in a modified virtual characterization associated with a confidence indicator which does not at least meet a threshold value, the navigation monitoring system 1010 is configured to implement the next level of "curation", which can include "additional data curation" 1007, where the processing module 1012 of the navigation monitoring system 1010 implements additional processing of a virtual characterization of one or more roadway portions based on input data associated with said roadway portions, received from one or more dedicated sensor suites which are dispatched to generate data associated with the roadway portions. Such implementation can include the processing module 1012 responding to a determination that the confidence indicator of a modified virtual characterization of a roadway portion, developed via manual curation 1005, does not at least meet a threshold. The threshold can be a confidence indication threshold associated with enabling autonomous navigation, a confidence indicator of a virtual characterization originally received at the navigation monitoring system 1010 from ANS 1004, some combination thereof, etc.

Responding to such a determination can include generating a dispatch command to one or more sensor suites 1022, which can be included in one or more dedicated sensor vehicles 1020, to proceed to the roadway portion characterized in the virtual characterization and generate additional input data associated with the roadway portion via the various sensor included in the sensor suite 1022. The processing module 1012 of the navigation monitoring system 1010 can communicate with said sensor suite 1022, via a communication module 1016 of the navigation monitoring system 1010. The navigation monitoring system 1010 can receive additional input data sets from the sensor suite 1022 and, via processing module 1012, implement additional processing of the virtual characterization of the roadway portion based at least in part upon the additional input data. The navigation monitoring system can modify the virtual characterization, based on the received one or more sets of additional input data, to generate a modified virtual characterization of the roadway portion with an associated confidence indicator which is superior to the confidence indicator associated with the virtual characterization of the roadway portion received from the ANS 1004. The curation 1007 can, in some embodiments, result in a modified virtual characterization of a roadway portion associated with a confidence indicator which at least meets a threshold confidence indication associated with enabling autonomous navigation of the roadway portion. Where the curation 1007 results in such a modified virtual characterization, the modified virtual characterization can be stored at the navigation monitoring system 1010, distributed to the ANS 1004, etc.

Figure 11:
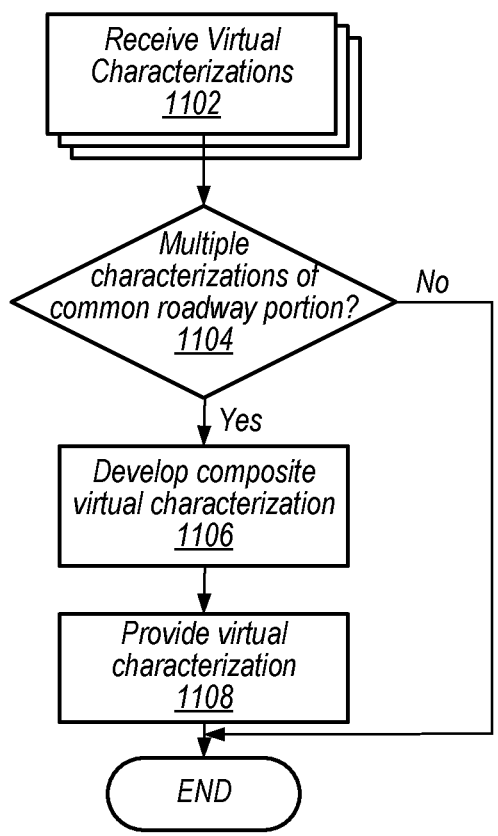
FIG. 11 illustrates receiving and processing virtual characterizations, of one or more roadway portions, according to some embodiments.

FIG. 11 illustrates receiving and processing virtual characterizations, of one or more roadway portions, according to some embodiments. The receiving and processing can be implemented on one or more computer systems, including one or more computer systems implementing one or more monitoring systems, ANSs, etc.

At 1102, one or more virtual characterizations are received. The one or more virtual characterizations can be received from one or more ANSs, monitoring systems, etc. Such virtual characterizations can be received at a navigation monitoring system, ANS, etc. A virtual characterization can include a virtual characterization of a roadway portion, a virtual characterization of a driving route, some combination thereof, etc.

At 1104, a determination is made regarding whether multiple received virtual characterizations are virtual characterizations of a common roadway portion, driving route, etc. For example, two separate virtual characterizations of a common roadway portion can be received from two separate ANSs. A determination of such commonality can be made based at least in part upon comparing one or more static feature characterizations, driving rule characterizations, etc. included in the various virtual characterizations. For example, a determination of such commonality can be made based at least in part upon a determination that two separate virtual roadway portion characterizations include a common set of geographic location coordinates in the static feature characterizations of the separate virtual characterizations.

If, at 1106, a determination is made that at least two virtual characterizations are present for a common roadway portion, driving route, etc., a composite virtual characterization is developed based at least in part upon each of the at least two virtual characterizations. Such development can include incorporating at least some elements of the various virtual characterizations into a common composite virtual characterization. For example, at least some static feature characterizations of one virtual characterization, and at least some static feature characterizations of another separate virtual characterization, can be incorporated into a composite virtual characterization.

If, at 1108, a virtual characterization is a unique virtual characterization of a roadway portion, driving route, etc., a composite virtual characterization of same, some combination thereof, or the like, the virtual characterization is provided to one or more recipients. Such recipients can include a local database, such that the virtual characterization is stored in the database. Such recipients can include one or more remotely-located ANSs, services, systems, etc., such that the virtual characterization is communicated to same via one or more communication links. The database can be included in a navigation monitoring system communicatively coupled to multiple ANSs, other monitoring systems, some combination thereof, or the like. The navigation monitoring system can distribute one or more stored virtual characterizations to one or more ANSs, monitoring systems, etc.

Figure 12:
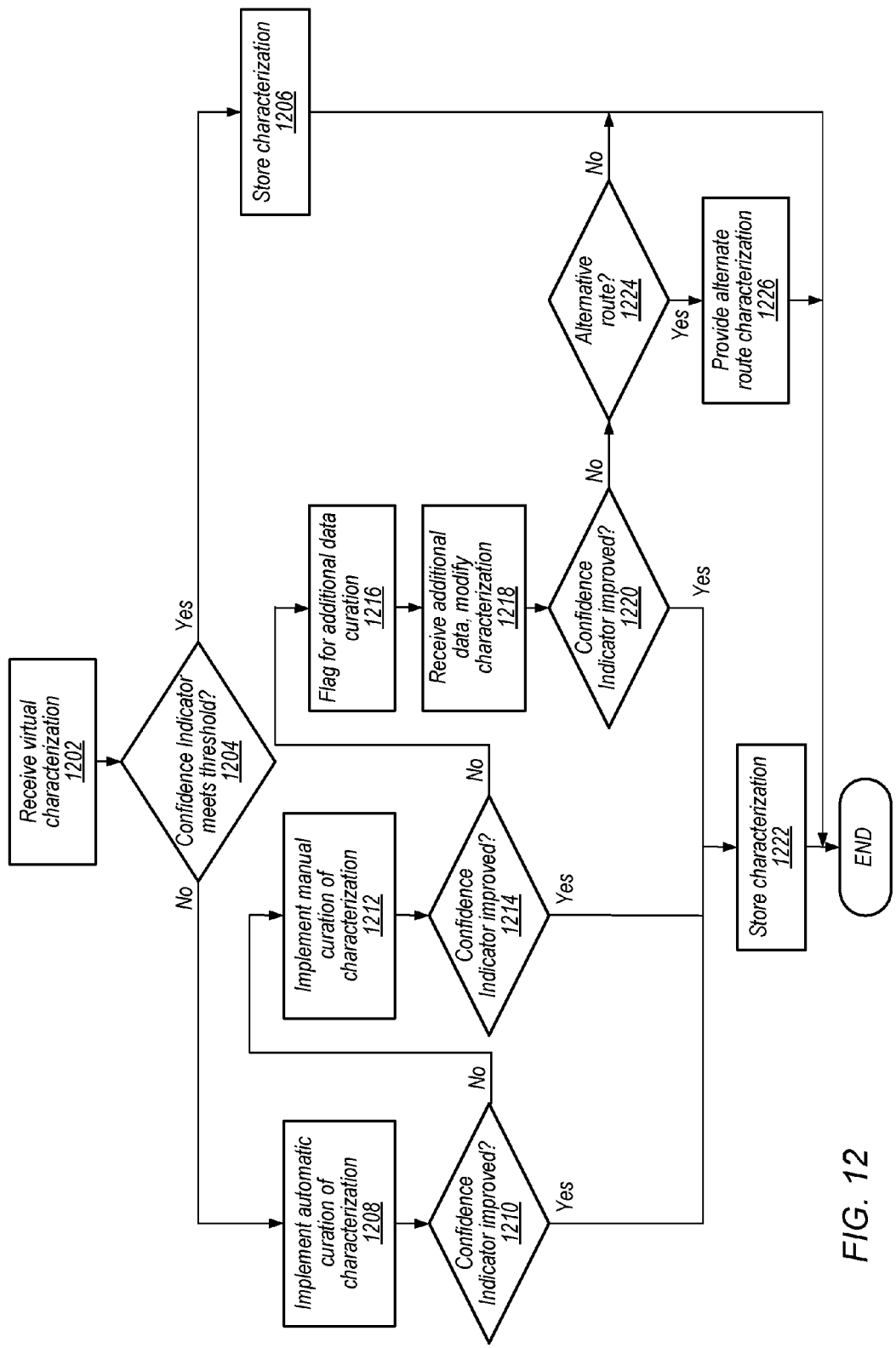
FIG. 12 illustrates implementing at least a portion of a curation spectrum with regard to one or more virtual characterizations, of one or more roadway portions, according to some embodiments.

FIG. 12 illustrates implementing at least a portion of a curation spectrum with regard to one or more virtual characterizations, of one or more roadway portions, according to some embodiments. The implementing can be implemented on one or more computer systems, including one or more computer systems implementing one or more monitoring systems, ANSs, etc.

At 1202, one or more virtual characterizations are received. The one or more virtual characterizations can be received from one or more ANSs, monitoring systems, etc. Such virtual characterizations can be received at a navigation monitoring system, ANS, etc. A virtual characterization can include a virtual characterization of a roadway portion, a virtual characterization of a driving route, some combination thereof, etc.

At 1204, a determination is made, for one or more received virtual characterizations, whether the respective virtual characterization has an associated confidence indicator which at least meets a certain threshold, which can be a threshold value associated with enabling autonomous navigation of the roadway portion characterized by the virtual characterization. If so, at 1206, the virtual characterization is stored in one or more databases.

If, as shown at 1208, a determination is made that a confidence indicator associated with a virtual characterization is less than a threshold value, automatic curation of the virtual characterization is implemented. Such implementation can include processing one or more elements of the virtual characterization, including one or more static feature characterizations, driving rule characterizations, etc., to generate a modified virtual characterization. In some embodiments, automatic curation is implemented without requiring any manual input from any human operators. Generating a modified virtual characterization, in some embodiments, includes establishing a confidence indicator associated with the modified virtual characterization.

At 1210, a determination is made regarding whether the confidence indicator associated with the modified virtual characterization has an improved value. An improved value can include a confidence indicator which is superior to the associated confidence indicator of the unmodified virtual characterization, a confidence indicator which at least meets a threshold value associated with enabling autonomous navigation, some combination thereof, or the like. If so, as shown at 1222, the modified virtual characterization is stored in a database. The modified virtual characterization can be distributed to one or more ANSs, monitoring systems, etc.

If not, as shown at 1212, manual curation of the virtual characterization is implemented. Such implementing can include flagging the virtual characterization for manual curation. Such flagging can include generating a warning message to one or more human operators supported by one or more computer systems, where the warning message instructs the one or more human operators to provide one or more manual input commands to modify one or more elements of the virtual characterization to generate a modified virtual characterization. The message can include an instruction to modify one or more particular elements of the virtual characterization. For example, where the confidence indicator being below a threshold is determined to be due to one or more particular elements of the virtual characterization, including one or more particular static feature characterizations included therein, the message can include an instruction to modify at least the one or more particular static feature characterizations. Manual curation can include implementing specific modifications to various characterizations included in the virtual characterization, based on manual inputs received from an operator.

At 1214, a determination is made regarding whether the confidence indicator associated with the modified virtual characterization has an improved value. An improved value can include a confidence indicator which is superior to the associated confidence indicator of the unmodified virtual characterization, a confidence indicator which at least meets a threshold value associated with enabling autonomous navigation, some combination thereof, or the like. If so, as shown at 1222, the modified virtual characterization is stored in a database. The modified virtual characterization can be distributed to one or more ANSs, monitoring systems, etc.

If not, as shown at 1216, the virtual characterization is flagged for additional data curation. Such flagging can include generating a message to one or more sensor suites, human operators of one or more sensor suites, one or more vehicles which include said one or more sensor suites, etc. to deploy the one or more sensor suites to the one or more roadway portions characterized in the virtual characterization to generate additional sets of input data associated with the one or more roadway portions.

At 1218, one or more sets of additional input data are received, and the virtual characterization is processed to modify one or more portions of the virtual characterization based on the additional input data. Such modification results in a generation of a modified virtual characterization, which can include an updated associated confidence indicator.

At 1220, a determination is made regarding whether the confidence indicator associated with the modified virtual characterization has an improved value. An improved value can include a confidence indicator which is superior to the associated confidence indicator of the unmodified virtual characterization, a confidence indicator which at least meets a threshold value associated with enabling autonomous navigation, some combination thereof, or the like. If so, as shown at 1222, the modified virtual characterization is stored in a database. The modified virtual characterization can be distributed to one or more ANSs, monitoring systems, etc.

If not, as shown at 1224, a determination is made regarding whether an alternative route is available with regard to a driving route in which the roadway portion characterized by the virtual characterization is included. If so, as shown at 1226, the alternative route is identified and associated with the virtual characterization, such that identifying a driving route which includes the roadway portion characterized by the virtual characterization includes identifying the alternative route.

Example Computer System

Figure 13:
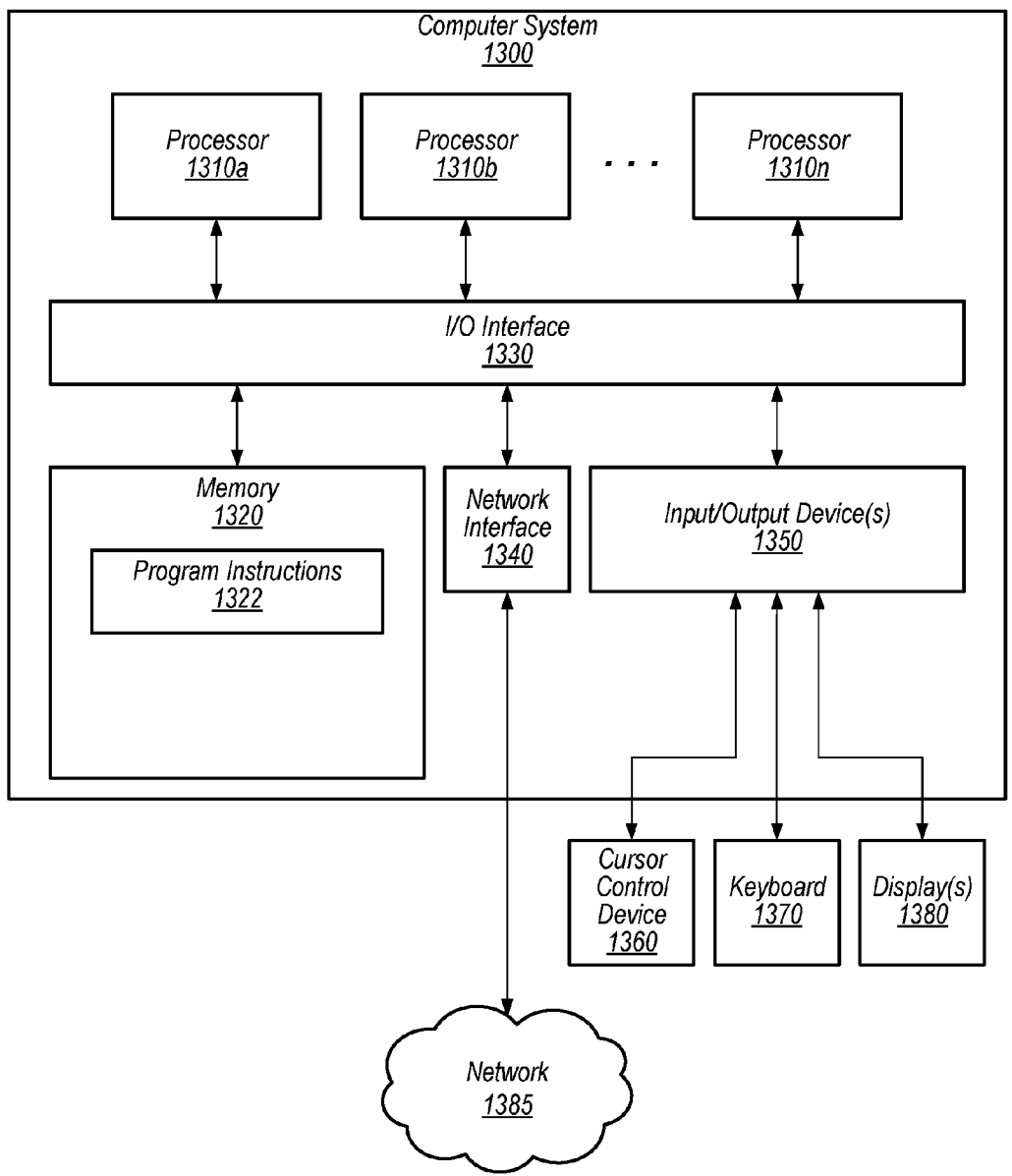
FIG. 13 illustrates an example computer system configured to implement aspects of a system and method for autonomous navigation, according to some embodiments.

FIG. 13 illustrates an example computer system 1300 that may be configured to include or execute any or all of the embodiments described above. In different embodiments, computer system 1300 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of an autonomous navigation system (ANS), as described herein, may be executed in one or more computer systems 1300, which may interact with various other devices. Note that any component, action, or functionality described above with respect to FIGS. 1 through 13 may be implemented on one or more computers configured as computer system 1300 of FIG. 13, according to various embodiments. In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices, which can include one or more user interface devices. In some cases, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store program instructions 1325, data 1326, etc. accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 1320 may be configured to implement some or all of an automotive climate control system incorporating any of the functionality described above. Additionally, existing automotive component control data of memory 1320 may include any of the information or data structures described above. In some embodiments, program instructions and/or data may be received, sent or stored upon different types of computer-accessible media or on similar media separate from system memory 1320 or computer system 1300. While computer system 1300 is described as implementing the functionality of functional blocks of previous Figures, any of the functionality described herein may be implemented via such a computer system.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network 1350 (e.g., carrier or agent devices) or between nodes of computer system 1300. Network 1350 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 1300. Multiple input/output devices may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1325, which may be processor-executable to implement any element or action described above. In one embodiment, the program instructions may implement the methods described above. In other embodiments, different elements and data may be included. Note that data may include any data or information described above.

Those skilled in the art will appreciate that computer system 1300 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
an autonomous navigation system configured to be installed in a vehicle and selectively enable autonomous navigation of the vehicle along a driving route, wherein the autonomous navigation system comprises:
at least one processor; and
a memory, comprising program instructions that when executed by the at least one processor cause the at least one processor to implement a route processing module and a route evaluation module;
the route processing module configured to implement a plurality of updates to a virtual characterization of the driving route, wherein:
each update is based on monitoring a separate one of a plurality of manual navigations of the vehicle along the driving route, wherein each manual navigation comprises the respective vehicle being navigated manually along the same driving route, and
implementation of each update of the plurality of updates includes association of a confidence indicator with the virtual characterization based on a monitored variation of the virtual characterization which is associated with the respective update; and
the route evaluation module configured to enable autonomous navigation of the driving route by the vehicle, based on a determination that a confidence indicator associated with the characterization of the driving route exceeds a threshold confidence indication.

2. The apparatus of claim 1, wherein:
the autonomous navigation system is configured to enable autonomous navigation of the driving route by the vehicle, independently of:
any data received from any devices external to the vehicle, and
any navigation data stored locally to the vehicle prior to any monitoring of navigation, by the vehicle, of any portion of the driving route.

3. The apparatus of claim 1, wherein the program instructions when executed by the at least one processor cause the at least one processor to further implement a curation module, the curation module configured to:
in response to a determination that the confidence indicator associated with the virtual characterization is changing at less than a threshold rate over at least a particular number of a succession of the plurality of updates to the virtual characterization, instruct a navigation monitoring system external to the vehicle to implement additional processing of the virtual characterization, such that the confidence indicator associated with the virtual characterization is improved relative to the threshold confidence indication.

4. The apparatus of claim 1, wherein:
the route processing module is configured to successively update the characterization of the driving route based on monitoring, from one or more sensors of the vehicle and during one or more navigations of the vehicle along the driving route, navigation patterns of one or more mobile entities navigating at least a portion of the driving route within a certain proximity to the vehicle.

5. The apparatus of claim 1, wherein:
the driving route comprises a plurality of roadway portions;
the route processing module is configured to implement a succession of updates to a virtual characterization of each of the roadway portions, wherein:
each update of each virtual characterization is based on monitoring a separate one of a succession of navigations of the vehicle along the respective roadway portion, and
implementing each update of the succession of updates includes associating a confidence indicator with the virtual characterization based on a monitored variation, of the virtual characterization which is associated with the respective update; and
the route evaluation module is configured to enable autonomous navigation of a limited selection of roadway portions of the driving route by the vehicle based on a determination that a confidence indicator associated with the virtual characterization of each of the limited selection of roadway portions exceeds the threshold confidence indication.

6. The apparatus of claim 5, wherein:
the route evaluation module is configured to enable autonomous navigation of a limited selection of roadway portions of the driving route by the vehicle based on a determination that a cumulative route length of the limited selection of roadway portions exceeds a threshold route length.

7. The apparatus of claim 1, wherein:
to implement at least one update, of the plurality of updates, to the virtual characterization of the driving route, the route processing module is configured to process sensor data, generated at the vehicle based on monitoring a separate one of the plurality of navigations of the vehicle along the driving route, in response to a determination that a processing capacity of the autonomous navigation system at least meets a threshold capacity.

8. The apparatus of claim 1, wherein the autonomous navigation system comprises:
an interface module configured to:

present, via a user interface of the vehicle and based at least in part upon autonomous navigation being enabled for one or more portions of the particular driving route, an indication that autonomous navigation is enabled for the driving route;

wherein the autonomous navigation system is configured to engage in autonomous navigation of the vehicle along the driving route, based at least in part upon receiving a command to engage in autonomous navigation of the vehicle along the driving route.

9. The apparatus of claim 8, wherein:

the autonomous navigation system is configured to, based at least in part upon a determination that autonomous navigation of the driving route is disabled:
identify an alternative driving route to a common destination location with the driving route; and
present, via the user interface of the vehicle, a prompt to a vehicle user to engage navigation, by the vehicle, along the alternative driving route to the common destination location.

10. A system, comprising:

one or more computing devices that implement a navigation monitoring system;
a network interface for the navigation monitoring system via which network communications may be transmitted between the navigation monitoring system and a plurality of different autonomous navigation systems installed at respective vehicles;
the navigation monitoring system, configured to:
receive, via the network interface, a plurality of virtual characterizations for one or more driving routes from the plurality of different autonomous navigation systems, wherein the plurality of virtual characterizations are generated at the different autonomous navigation systems according to respective sensor data captured at the vehicles during manual navigations of the vehicles along the one or more driving routes, wherein the manual navigations comprise the vehicles being navigated manually along the one or more driving routes;
generate a composite virtual characterization of at least one of the driving routes based on at least some of the plurality of virtual characterizations; and
send, via the network interface, the composite virtual characterization to one of more of the different autonomous navigation systems.

11. The system of claim 10, wherein the navigation monitoring system is further configured to compare static features or vehicular driving rules included in the plurality of virtual characterizations to identify the at least some virtual characterizations as virtual characterizations of a common roadway portion.

12. The system of claim 10, wherein the navigation monitoring system is further configured to:
store the plurality of virtual characterizations of the plurality of driving routes;
receive a request for a particular driving route from one of the autonomous navigation system;
in response to the request:
retrieve a corresponding one of the plurality of virtual characterizations; and
send the corresponding virtual characterization to the one autonomous navigation system.

13. The system of claim 10, wherein the navigation monitoring system is further configured to:

receive a request for additional processing of one of the virtual characterizations of one of the driving routes from an autonomous navigation system;
modify the one virtual characterization such that a confidence indicator associated with the one virtual characterization is increased; and
send the modified virtual characterization to the autonomous navigation system.

14. The system of claim 13, wherein to modify the one virtual characterization, the navigation monitoring system is configured to provide the one virtual characterization to an operator of the navigation monitoring system for manual modification of one or more portions of the one virtual characterization.

15. The system of claim 14, wherein to modify the one virtual characterization, the navigation monitoring system is further configured to:
determine that the manual modification of the one or more portions of the one virtual characterization does not increase the confidence indicator associated with the one virtual characterization above a threshold level;
in response to the determination that that the manual modification of the one or more portions of the one virtual characterization does not increase the confidence indicator associated with the one virtual characterization above the threshold level:
dispatch a sensor suite to collect additional data associated with one or more roadway portions along the one driving route;
receive, via the network interface, the additional data collected by the sensor suite; and
process the additional data to perform additional modification of the one or more portions of the one virtual characterization.

16. The system of claim 10, wherein the navigation monitoring system is further configured to:
receive a request for additional processing of one of the virtual characterizations of one of the driving routes from an autonomous navigation system;
perform one or more modifications to the one virtual characterization;
determine that a confidence indicator associated with the one virtual characterization does not exceed a threshold level as a result of the modifications; and
send an alternative driving route for the one driving route to the autonomous navigation system.

17. A method, comprising:
performing, by one or more computing devices:
receiving, via a network interface at a navigation monitoring system, a plurality of virtual characterizations for one or more driving routes from a plurality of different autonomous navigation systems installed at respective vehicles, wherein the plurality of virtual characterizations are generated at the different autonomous navigation systems according to respective sensor data captured at the vehicles during manual navigations of the vehicles along the one or more driving routes, wherein each manual navigation comprises the respective vehicle being navigated manually along a respective driving route of the one or more driving routes;
generating, by the navigation monitoring system, a composite virtual characterization of at least one of the driving routes based on at least some of the plurality of virtual characterizations; and sending, by the navigation monitoring system via the network interface, the composite virtual characterization to one of more of the different autonomous navigation systems.

18. The method of claim 17, further comprising:

storing, by the navigation monitoring system, the plurality of virtual characterizations of the plurality of driving routes;

receiving, at the navigation monitoring system, a request for a particular driving route from one of the autonomous navigation system;

in response to the request:
  retrieving, by the navigation monitoring system, a corresponding one of the plurality of virtual characterizations; and
  sending, by the navigation monitoring system, the corresponding virtual characterization to the one autonomous navigation system.

19. The method of claim 17, further comprising:

receiving, at the navigation monitoring system, a request for additional processing of one of the virtual characterizations of one of the driving routes from an autonomous navigation system;

modifying, by the navigation monitoring system, the one virtual characterization such that a confidence indicator associated with the one virtual characterization is increased; and sending, by the navigation monitoring system, the modified virtual characterization to the autonomous navigation system.

20. The method of claim 17, further comprising:

receiving, at the navigation monitoring system, a request for additional processing of one of the virtual characterizations of one of the driving routes from an autonomous navigation system;

performing, by the navigation monitoring system, one or more modifications to the one virtual characterization;

determining, by the navigation monitoring system, that a confidence indicator associated with the one virtual characterization does not exceed a threshold level as a result of the modifications; and sending, by the navigation monitoring system, an alternative driving route for the one driving route to the autonomous navigation system.

* * * * *